United States Patent
Richards et al.

(10) Patent No.: US 9,939,993 B2
(45) Date of Patent: Apr. 10, 2018

(54) JUKEBOX NETWORK SYSTEM

(71) Applicant: AMI Entertainment Network, LLC, Trevose, PA (US)

(72) Inventors: Ronald Richards, Elmhurst, IL (US); Danny Garrett, Batavia, IL (US); John Groppe, Westchester, IL (US); Marc Saegesser, West Chicago, IL (US); Charles Jaros, Chicago, IL (US); Jesse Buck, Elmhurst, IL (US); Eran Loewenthal, Oak Park, IL (US); Jeffrey J. Kalis, Sparta, MI (US); Constantin Hapaianu, Cluj-Napoca (RO)

(73) Assignee: AMI ENTERTAINMENT NETWORK, LLC, Trevose, PA (US)

( * ) Notice: Subject to any disclaimer, the term of this patent is extended or adjusted under 35 U.S.C. 154(b) by 366 days.

(21) Appl. No.: 14/722,878

(22) Filed: May 27, 2015

(65) Prior Publication Data
US 2015/0261396 A1    Sep. 17, 2015

Related U.S. Application Data

(63) Continuation of application No. 12/764,605, filed on Apr. 21, 2010, now abandoned.
(Continued)

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/038* (2013.01); *G06F 3/0488* (2013.01); *G06F 17/30772* (2013.01); *G06F 2203/0383* (2013.01)

(58) Field of Classification Search
CPC ...... G11B 19/025; G11B 21/08; G11B 27/002; G11B 27/34; G11B 27/105; G11B 27/11; H04N 21/25891; H04N 21/8113
See application file for complete search history.

(56) References Cited

U.S. PATENT DOCUMENTS 5,959,945 A    9/1999  Kleiman
RE38,353 E    12/2003  Peterson
(Continued)

FOREIGN PATENT DOCUMENTS

WO    2010124007 A1    10/2010

OTHER PUBLICATIONS

Office Action dated Feb. 2, 2017 in CA Application No. 2,758,561.
(Continued)

*Primary Examiner* — Claudia Dragoescu
(74) *Attorney, Agent, or Firm* — Panitch Schwarze Belisario & Nadel LLP

(57) ABSTRACT

A plurality of jukeboxes each having a display, input component, audio output, and controller are connected over a network. The controller is configured to play music data sets selected by a user and to store local affinity data uploadable to the network. The controller is further configured to store network popularity and affinity data received from the network. The controller causes the display to present menus and screens based on the data received from the network. The controller is also configured to perform searches over multiple identification categories and store collections of music data sets based on multiple identification categories.

13 Claims, 10 Drawing Sheets

Related U.S. Application Data

(60) Provisional application No. 61/171,327, filed on Apr. 21, 2009.

(51) Int. Cl.
  *G06F 3/038*  (2013.01)
  *G06F 3/0488* (2013.01)
  *G06F 17/30*  (2006.01)

(56) References Cited

U.S. PATENT DOCUMENTS

| | | | |
|---|---|---|---|
| 6,970,834 B2 | 11/2005 | Martin et al. | |
| 7,219,153 B1* | 5/2007 | Day | H04L 29/06027 707/999.01 |
| 7,548,958 B2 | 6/2009 | Martin et al. | |
| 8,260,656 B1* | 9/2012 | Harbick | G06Q 30/02 705/26.7 |
| 2003/0005035 A1 | 1/2003 | Rodgers | |
| 2003/0041325 A1 | 2/2003 | Nathan et al. | |
| 2003/0135424 A1 | 7/2003 | Davis et al. | |
| 2004/0243482 A1 | 12/2004 | Laut | |
| 2006/0159109 A1 | 7/2006 | Lamkin et al. | |
| 2006/0161952 A1* | 7/2006 | Herz | G06Q 20/383 725/46 |
| 2006/0195789 A1* | 8/2006 | Rogers | G06F 17/30766 715/727 |
| 2006/0227673 A1 | 10/2006 | Yamashita et al. | |
| 2007/0033321 A1* | 2/2007 | Martin | G11B 27/105 711/100 |
| 2007/0288470 A1 | 12/2007 | Kauniskangas et al. | |
| 2008/0056075 A1 | 3/2008 | Kalis | |
| 2008/0086379 A1 | 4/2008 | Dion et al. | |
| 2008/0091717 A1 | 4/2008 | Garbow et al. | |
| 2009/0070369 A1 | 3/2009 | Kalis et al. | |
| 2010/0269042 A1 | 10/2010 | Richards et al. | |

OTHER PUBLICATIONS

International Search Report dated May 27, 2010 in Int'l Application No. PCT/US10/31919; Written Opinion.
Int'l Preliminary Report on Patentability dated Oct. 25, 2011 in Int'l Application No. PCT/US2010/031919.
Office Action dated May 30, 2013 in GB Application No. GB1118190.6.
Office Action dated Jul. 20, 2012 in U.S. Appl. No. 12/764,605.
Office Action dated Nov. 7, 2012 in U.S. Appl. No. 12/764,605.
Office Action dated Oct. 24, 2013 in GB Application No. GB1118190.6.
Office Action dated Feb. 7, 2014 in GB Application No. GB1118190.6.
Office Action dated Feb. 27, 2015 in U.S. Appl. No. 12/764,605.
Office Action dated Oct. 6, 2014 in U.S. Appl. No. 12/764,605.
Office Action dated Jun. 20, 2014 in U.S. Appl. No. 12/764,605.
Office Action dated Jan. 27, 2014 in U.S. Appl. No. 12/764,605.
Office Action dated Aug. 30, 2013 in U.S. Appl. No. 12/764,605.
Office Action dated Apr. 8, 2016 in CA Application No. 2,758,561.

\* cited by examiner

JUKEBOX NETWORK SYSTEM

CROSS-REFERENCE TO RELATED APPLICATIONS

This application is a continuation of U.S. patent application Ser. No. 12/764,605, filed on Apr. 21, 2010, entitled "Jukebox Menu Navigation System," currently pending, which claims the benefit of U.S. Provisional Patent Application No. 61/171,327, filed on Apr. 21, 2009, entitled "Jukebox Menu Navigation System," the entire contents of all of which are incorporated by reference herein.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

An embodiment of the present invention relates generally to a jukebox menu navigation system, and more particularly, to improvements for menu navigation based primarily on aggregation and distribution of network-wide data.

Jukeboxes having a plurality of songs available for selection and play are generally known. Jukeboxes typically operate upon input of currency and are installed in locations such as bars, restaurants, airports, shopping malls, video arcades, casinos or the like. Upon receipt of currency, a user is prompted to select one or more songs for play, typically over a public speaker system installed in the location of the jukebox. Originally, the music selections were provided on 45 rpm records that were played by an automated turntable in the jukebox. The vinyl records were eventually replaced by compact discs (CDs) and the turntable replaced by a CD player. More recently, jukeboxes have become computerized, capable of playing selections of music as MP3 files, streaming audio data sets, or the like.

In particular, jukeboxes are presently connected to networks and can receive digital audio files over Broadband connections, thereby reducing memory size requirements. Despite the network capabilities, current jukeboxes still have functional limitations that limit the information and experience that may be provided to a user.

It is desirable to provide a jukebox network that compiles and distributes affinity data to a plurality of jukeboxes, each of which may present song choices that are commonly selected by users network-wide. It is further desirable to provide a searching feature that allows a user to search multiple categories when selecting music. It is also desirable to provide a jukebox with the ability to create collections comprising a combination of artists, albums, and songs. It is still further desirable to provide a jukebox network that compiles and distributes network popularity data to a plurality of jukeboxes, each of which may present an ordered list of the most popular songs, artists, and albums network-wide.

BRIEF SUMMARY OF THE INVENTION

Briefly stated, an embodiment of the present invention comprises a jukebox device configured to play music data sets. Each music data set has a plurality of identification values corresponding to a respective plurality of identification categories. The jukebox device includes a display, an input component, an audio output and a controller. The controller is configured to receive a string of characters from the input component, and to search simultaneously across the plurality of identification categories for identification values containing the string of characters. The controller is further configured to cause the display to present the identification values containing the string of characters for each of the plurality of identification categories.

Another preferred embodiment comprises a jukebox network system having a plurality of jukebox devices connected over a network. Each of the jukebox devices includes a display, an input component, an audio output, and a controller configured to store local affinity data uploadable to the network. The local affinity data includes identification of music data sets selected from a plurality of music data sets during a common credit session. The controller is also configured to store network affinity data received from the network. The network affinity data includes pairs of music data sets having high affinity values determined from the local affinity data received by the network from the plurality of jukebox devices. The controller is further configured to retrieve for play a first music data set selected by a user upon establishment of a one or more credits. The controller is also configured to cause the display to present an option to select and play at least one second music data set selected from the network affinity data.

Still another preferred embodiment comprises a jukebox network system having a plurality of jukebox devices connected over a network. Each of the jukebox devices includes a display, an input component, an audio output, and a controller configured to retrieve for play at least one music data set selected by a user from a plurality of music data sets upon establishment of one or more credits. Each music data set has a plurality of identification values corresponding to a respective plurality of identification categories. The controller is further configured to store local play data uploadable to the network. The local play data includes a number of times a music data set is selected for play on the jukebox device. The controller is also configured to store network popularity data received from the network. The network popularity data includes popularity values for at least a portion of the plurality of identification values in at least one of identification categories. The popularity values are determined from the local play data received by the network from the plurality of jukebox devices. The controller is further configured to cause the display, for a user-selected one of the plurality of identification values in at least one user-selected identification category, to present corresponding identification values in another of the identification categories in a predetermined configuration based on the respective popularity values of the corresponding identification values.

BRIEF DESCRIPTION OF THE DRAWINGS

The foregoing summary, as well as the following detailed description of preferred embodiments of the invention, will be better understood when read in conjunction with the appended drawings. For the purpose of illustration, there are shown in the drawings embodiments which are presently preferred. It should be understood, however, that the invention is not limited to the precise arrangements and instrumentalities shown.

DETAILED DESCRIPTION OF THE INVENTION

Figure 1:
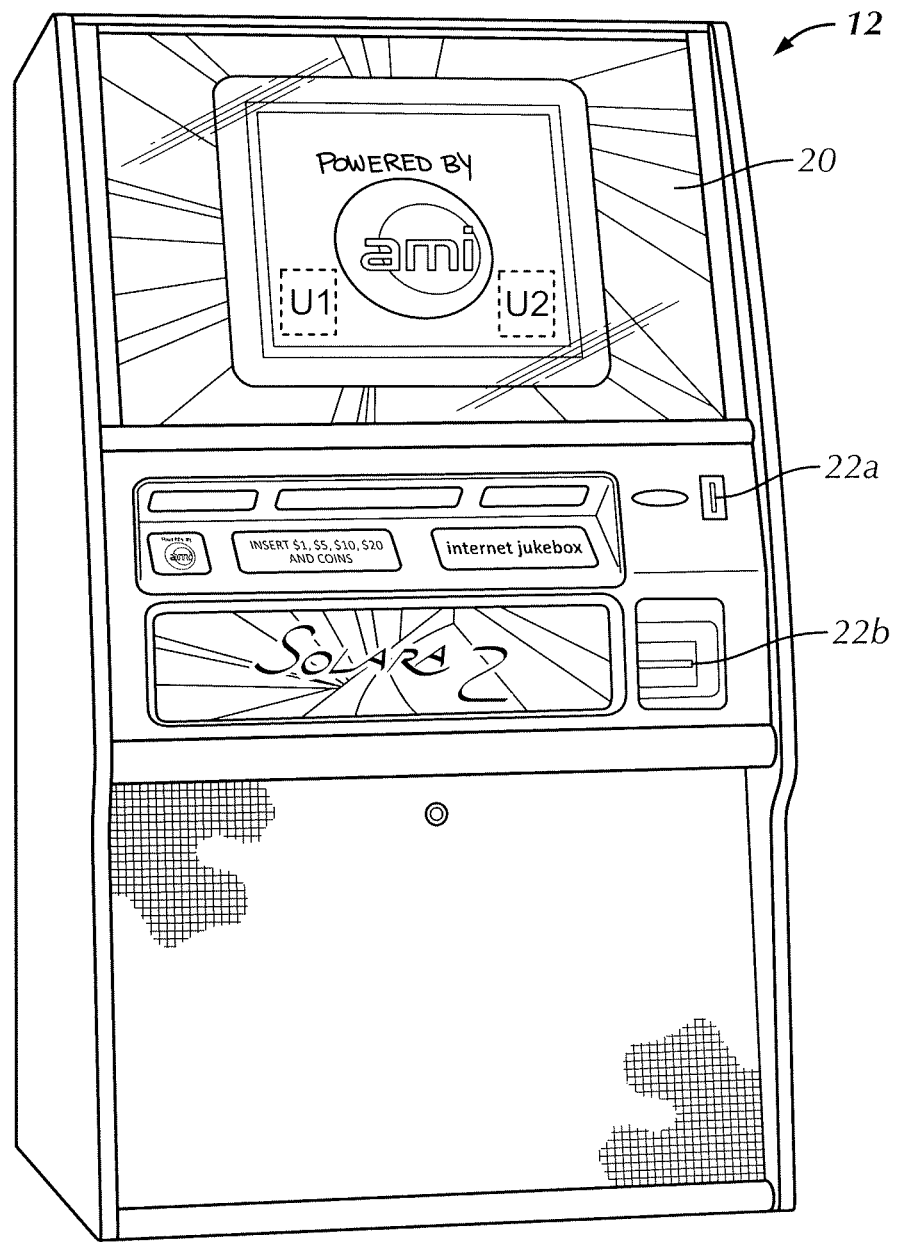
FIG. 1 is a perspective view of a jukebox device for use in accordance with preferred embodiments of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the apparatus and designated parts thereof. The terminology includes the above-listed words, derivatives thereof, and words of similar import. Additionally, the words "a" and "an", as used in the claims and in the corresponding portions of the specification, mean "at least one." Further, the terms "coin" or "currency" should not be construed as limiting and can be used herein to mean all forms of coin and paper currency from any country as well as proprietary tokens, game cards, credit cards, debit cards, chits, or other representative forms of credit and/or payment.

This patent application includes Appendices which are incorporated by reference into the present patent application. At least one preferred embodiment of the present invention is implemented via the source code in the Appendices. The Appendices are subject to the "Copyright Notice and Authorization" stated above.

Figure 2:
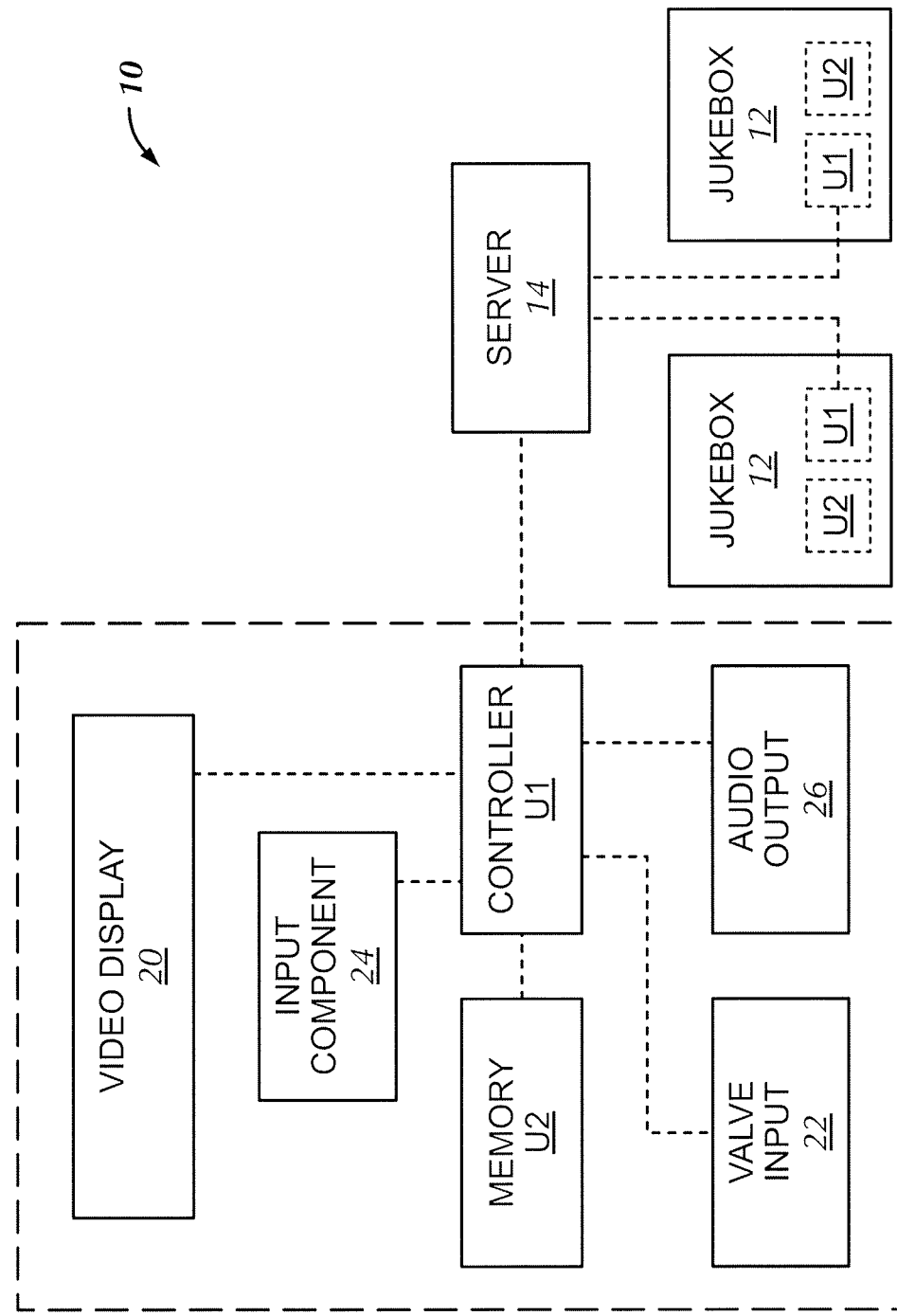
FIG. 2 is a schematic view of a jukebox network in accordance with preferred embodiments of the present invention.

Referring to the drawings in detail, wherein like reference numerals indicate like elements throughout, there is shown in FIGS. 1 and 2 a preferred embodiment of a jukebox device 12. The jukebox device 12 includes a controller U1 and a memory U2. The memory U2 can be any known or suitable memory device or combination of such devices such as random access memory (RAM), read only memory (ROM), flash RAM, hard disk, optical disk, or the like. The jukebox device 12 further includes a video display 20 that is operatively connected to the controller U1. Preferably, the video display 20 is a touchscreen video display configured to accept touch input. The jukebox device 12 shown in FIG. 1 is a free-standing or floor-standing apparatus, but may also be arranged in any configuration including table mount, wall mount, pole mount, and the like without departing from the invention.

The jukebox device 12 may also include at least one value input or value acceptor 22 that receives value in order to establish one or more credits. The value received may be at least one of currency, coins, tokens, chits, credits, credit cards/debit cards, or the like. FIG. 1 shows a coin acceptor 22a and a bill acceptor 22b as part of the jukebox device 12. In addition, value may also be received through input of a keypad or touchscreen of online account data, personal identification numbers (PINs), or the like, which may obviate the need for a value acceptor 22, although such methods are not mutually exclusive and may both be provided to provide the user with a wide array of payment options. Preferably, the jukebox device 12 is made operable only upon receipt of value, for example, a user may only select and play a song once value is received and/or one or more credits are established. However, free selections may be offered at the discretion of an operator of the jukebox device 12.

As shown in FIG. 2, an input component 24 is coupled to the controller U1. The input component 24 is preferably a touchscreen input from the display 20, but may also be one or more of a pushbutton(s), a track-ball or touchpad, a mouse, a joy-stick, a foot-pedal, a voice recognition system, a keypad or keyboard, and the like. Further, multiple input components 24 of the foregoing or other types may be provided on the jukebox device 12.

The jukebox device 12 also includes an audio output 26 coupled to the controller U1. The audio output 26 is preferably a digital amplifier with multi-channel pre-amplifier and one or more sockets for connection to one or more speakers or the like (not shown). Additionally, the audio output 26 may comprise one or more sockets for connection to an external audio amplification system (not shown), such as a stereo, wall-mounted speakers, surround sound system, or the like. The audio output 26 may also comprise one or more speakers internally housed by the jukebox device 12. Volume may be controlled by an external control, wireless remote, or an on-screen volume control manipulated via the touchscreen display 20.

FIG. 2 shows the jukebox device 12 as part of a network 10 having a plurality of additional jukebox devices 12 connected thereto. Each of the jukebox devices 12 is preferably in communication with a server 14. However, intermediate connections to the server 14, such as additional file servers, computers, other jukebox devices 12, or the like, may also be implemented. Further, functions of the server 14 may be divided among a plurality of devices. The controller U1 of the jukebox device 12 preferably communicates with the server 14 over an Ethernet port, a wireless transceiver, or the like and may communicate with other devices or file servers, access the Internet, communicate over wide area networks (WANs) or local area networks (LANs), or the like. The jukebox device 12 remains operable even if disconnected from the network 10 or is only connected to the network 10 via a dial-up connection. In dial-up mode, the jukebox 12 still may receive data from the server 14 as described below. However, once the relevant data is received, the jukebox device 12 operates in a disconnected state. While retaining all of its usual functionality, as will be described below, operation of the jukebox device 12 is limited to content available locally, rather than content available through the network.

Turning now to the operation of the jukebox device 12, the memory U2 may store a plurality of music data sets and a system control program. A music data set includes the audio data required for playing a song through the output component or audio output 26, and may be stored in any conventional format, such as an MP3 file, WAV file, or the like. The music data set also includes a plurality of identification values (also known as "metadata") corresponding to a respective plurality of identification categories. Examples of identification categories include a song title, an album title, an artist name, a genre of music, or the like. Music data sets may also be stored remotely, such as at the server 14 or other remote file storage locations accessible by the controller U1. When retrieved remotely, a music data set may be streamed to the controller U1 via a Broadband connection or the like. Alternatively, a music data set may be downloaded by the jukebox device 12 from the memory U2, on instruction, onto the hard drive of the jukebox device 12. Preferably, the music data set is downloaded in its entirety. The jukebox device 12 then plays the music data set off of the jukebox hard drive. The music data set is preferably provided serially to the memory U2 or a temporary memory of the controller U1 and the music data set is played as packets thereof are being received. The music data set does not necessarily remain in the jukebox device memory once it has been played. The music data set is preferably buffered such that a minor interruption in the music data set download does not cause an interruption in the audio performance of the jukebox device 12.

The controller U1 is configured to retrieve for play, either from the memory U2 or from a remote location, such as the server 14, at least one music data set selected by a user from the plurality of stored music data sets upon establishment of one or more credits. The controller U1 also controls the video display 20 based upon a system control program retrieved from the memory U2 and based upon inputs from the touchscreen or other input component 24. As used herein, the system control program refers to all of the software functions outside of the application program files including an operating system, display control, input control, sound drivers, and the like.

In a first preferred embodiment of the present invention, play data based on user selected music data sets from the plurality of jukebox devices 12 are aggregated over the network 10 in order to determine the most popular, songs, albums, artists, or the like on a network-wide basis for use in the plurality of jukebox devices 12.

Accordingly, the controller U1 of each jukebox device 12 preferably stores local play data to the memory U2. The local play data preferably includes a number of times that each particular music data set is selected for play on the particular jukebox device 12. The local play data is uploadable to the network 10, where it is received by the server 14, preferably in response to periodic server generated requests for data. The local play data from each jukebox device 12 of the network 10 may be uploaded at regular predetermined periodic intervals, such as hourly, daily, weekly, or the like. However, it will be understood by those skilled in the art that the intervals of uploading need not be predetermined, but rather may be unplanned and sporadic.

The server 14 stores a plurality of tables for aggregating the local play data from all of the jukebox devices 12 to generate network popularity data. Preferably three tables are kept, a daily table, a monthly table, and a yearly table. However, it will be understood by those skilled in the art that other time frames and durations may also be utilized. In order to conserve space at the server 14, the daily table may only contain the previous thirty-one days of data, the monthly table may only contain the previous thirteen months of data, the yearly table may only contain the previous three years of data, or the like. All of the tables are preferably continuously updated at the server 14 upon receipt of the local play data from the plurality of jukebox devices 12.

The server 14 periodically sends network popularity data back to each of the jukebox devices 12 over the network 10. Preferably, the predetermined periodic interval between the time that the network popularity data is sent is long enough to allow for significant changes in popularity, such as a week. However, the interval may be set to any duration as desired, and is preferably controlled using a Macro4 (M4) variable. The network popularity data is preferably kept in a compressed data file that may be downloaded by a jukebox device 12 via a Uniform Resource Locator (URL), however, the popularity data may also be sent directly to the jukebox device 12. The controller U1 of each of the plurality of jukebox devices 12 is configured to store the network popularity data in the memory U2.

Figure 3:
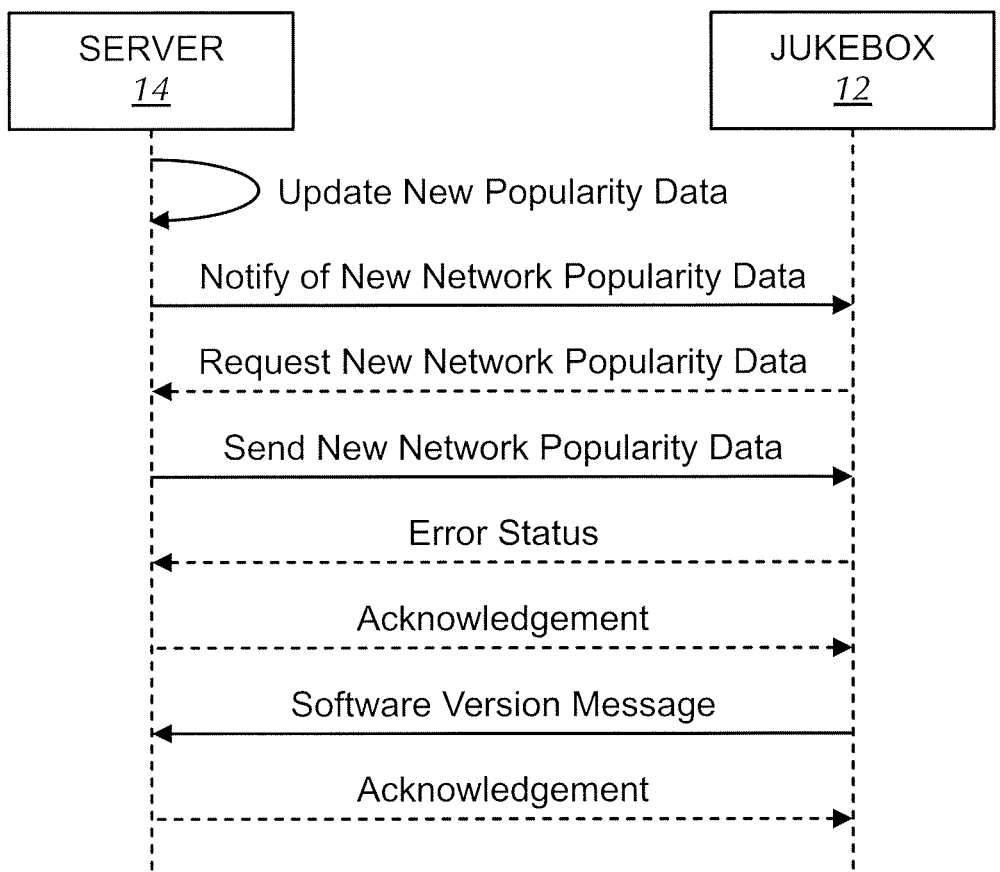
FIG. 3 is a first message sequence diagram of communication between the server and jukebox of FIG. 2.

FIG. 3 is a diagram of a message sequence between the server 14 and a jukebox device 12 when a new version of the downloadable network popularity data is created. The server 14 notifies the jukebox device 12 that a new version of the network popularity data file is available. The jukebox device 12 responds with a request for the updated network popularity data. The jukebox device 12 may either request the URL or a message containing the network popularity data, in which case the jukebox device 12 may specify limits on the data. An exemplary portion of an Extensible Markup Language (XML) request, including .xsd and .xml files for both types of requests, is attached as Appendix 1. The server 14 responds with either the requested URL or the requested data. An exemplary portion of an XML response, including the relevant .xsd and .xml files, is attached as Appendix 2. Once the response from the server 14 is received, the jukebox device 12 responds with an Error Status Message to acknowledge whether the response from the server 14 was received successfully. The server 14 responds with an acknowledgement (ACK) message. Once the network popularity data is processed in the controller U1, the jukebox device 12 sends a Software Version Message (see exemplary XML message attached as Appendix 3) containing the version of the network popularity data received by the jukebox device 12. The server 14 responds with an ACK message. The jukebox device 12 keeps track of the version number of the popularity data it receives as part of its software version data.

Figure 4:
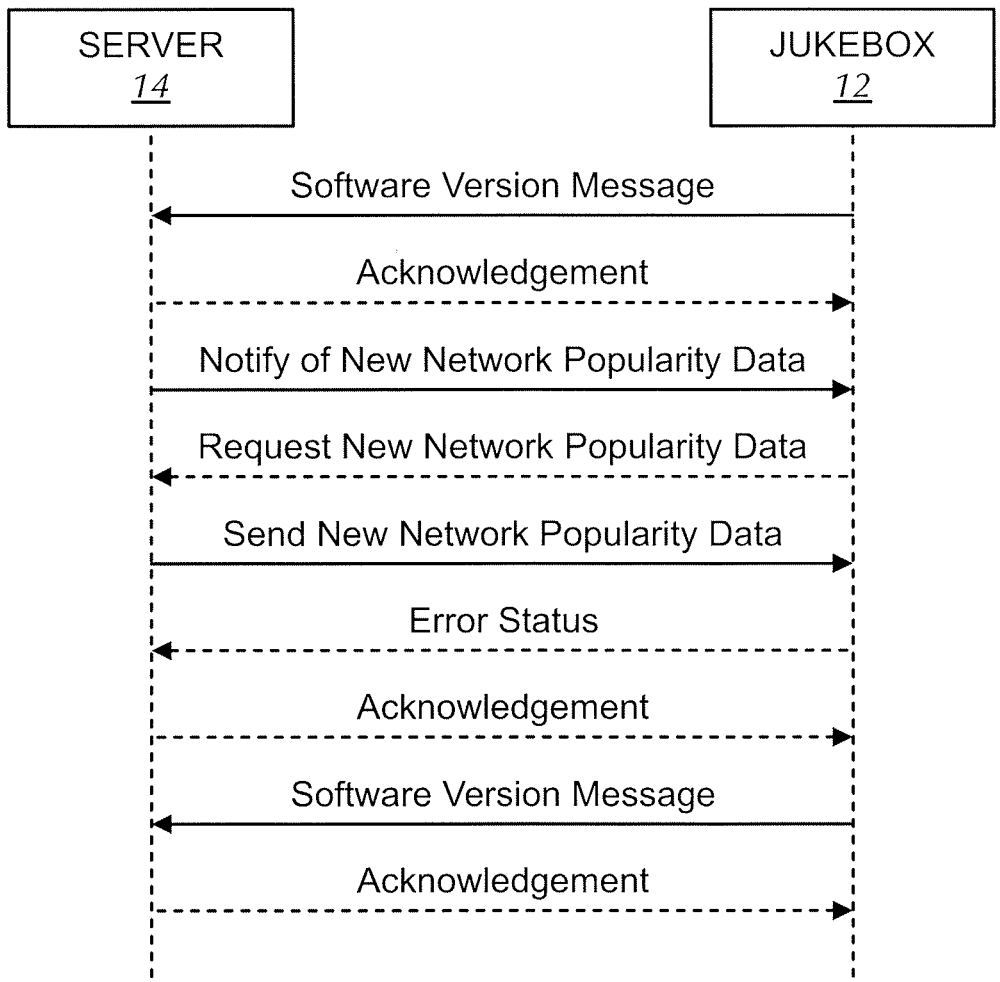
FIG. 4 is a second message sequence diagram of communication between the server and jukebox of FIG. 2.

FIG. 4 is a similar diagram to FIG. 3, except that the message sequence is triggered by a jukebox device 12 connecting to the network 10 and reporting to the server 14 that its version of the network popularity data is out of date. This is preferably done by a Software Version Message. The server 14 responds with an ACK message before proceeding in the manner as detailed above with respect to FIG. 3.

The network popularity data preferably includes popularity values for at least a portion of the identification values in at least one of the identification categories. Preferably, network popularity data is generated and stored for a plurality of the identification values in a plurality of the identification categories. The popularity values are determined from the local play data from each of the plurality of jukebox devices 12 on the network 10. For example, the popularity values may be the aggregate number of plays over a predetermined period, such as a day, week, month, or the like, of a particular song, album, artist, or the like. The popularity values may also be relative rankings of, for example, a song, such that a popularity value of "1" indicates the song selected for play the most number of times over a certain period, "2" indicates the song selected for play the second most number of times over the same period, and the like.

Preferably, the entirety of the network popularity data is sent back to each of the jukebox devices 12. Alternatively, the amount of network popularity data sent to each of the jukebox devices 12 may be arbitrarily set in order to limit the size of the file. For example, for each identification category, only the top 100 identification values would be included in the file. Alternatively, a song, artist, or the like may be required to exceed a certain number of plays in order to be included in the network popularity data.

Figure 5:
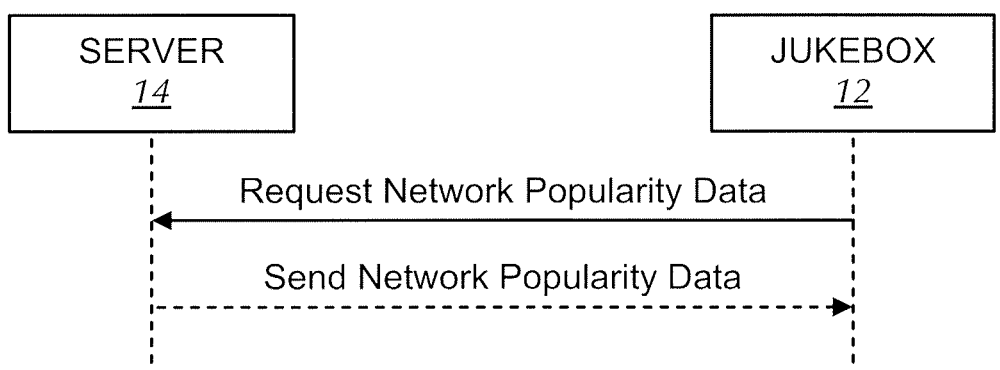
FIG. 5 is a third message sequence diagram of communication between the server and jukebox of FIG. 2.

The network 10 may also provide for on-demand requests by a jukebox device 12 for specific network popularity data from the server 14. As shown by FIG. 5, the message sequence is a basic request-response interaction. The jukebox device 12 sends a request message specifying a particular identification category and other parameters, such as groupings, limits, or the like. An exemplary on-demand request, including .xsd and .xml files for requesting specific songs for specific genres, specific albums from specific artists, and songs for specific artists, is attached as Appendix 4. The response from the server 14 may be organized hierarchically depending on the request from the jukebox device 12. An exemplary response, including .xsd and .xml files for responding to a request for songs for a specific genre, is attached as Appendix 5.

Once the jukebox device 12 has the latest network popularity data, the controller U1 is configured to cause the video display 20, for a user-selected one of the plurality of identification categories in at least one user-selected one of the plurality of identification categories, to present corresponding identification values in another of the plurality of identification categories in a predetermined configuration based on the respective popularity values of each of the corresponding identification values.

Figure 6:
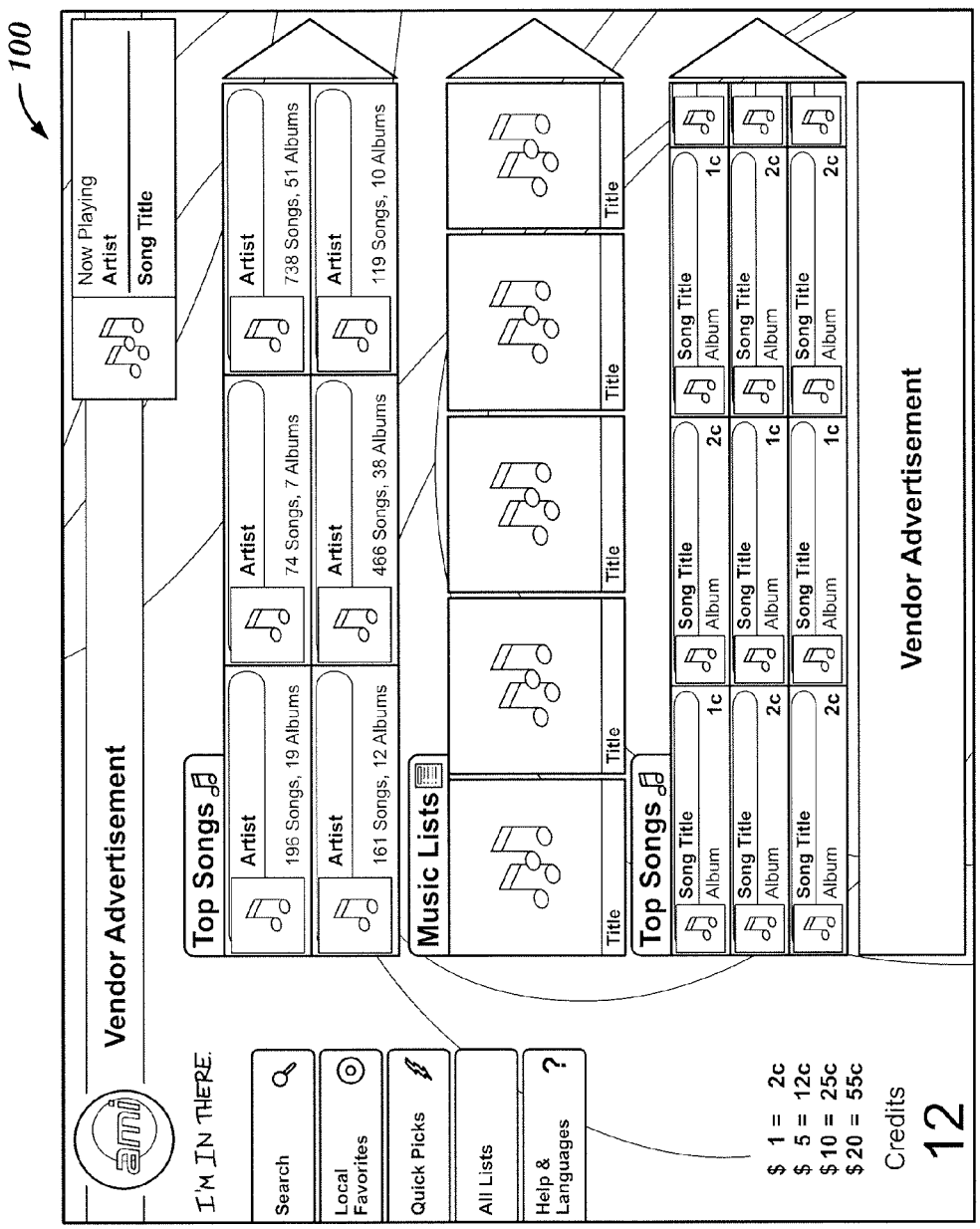
FIG. 6 is a screenshot of a menu displayed on a jukebox device in accordance with preferred embodiments of the present invention.

FIG. 6 is an exemplary screenshot 100 from a jukebox device 12. A "Top Artists" list is shown near the top of the screenshot 100. The artists are listed in order of the popularity values associated with each of the artists, from those associated with the highest popularity values to artists associated with the lowest popularity values. While six artists are shown, the entire list may be smaller or larger, in accordance with limits as described above, and may provide scrolling or paging capability to view the remainder of the list. Additional information may be provided in the list, such as the number of songs, albums, or the like associated with the displayed artist, photos, advertisements, or the like.

Similarly, a "Top Songs" list is shown near the bottom of the screenshot 100. The songs are listed in order of the popularity values associated with each song. Additional information, such as the artist of the displayed song, the required number of credits for play of the song, cover art, or the like, may also be displayed. Other lists may also be shown, such as by genre, album, or the like.

In the event that a jukebox device 12 becomes disconnected from the network 10, the network becomes unavailable, or other service disruptions occur, the listings of identification values and derivative information thereof may be changed to correspond to available selections of music data sets. For example, during connection to the network 10, the "Top Artists" list will display the number of available albums and songs for the respective artist that are available over the entire network 10 (i.e., residing in the server 14 or other remote storage). However, during a network disruption, the number of available albums and songs displayed corresponds only to the music data sets that are stored locally, i.e. in the memory U2 or the like of the particular (local) jukebox device 12.

Lists of identification values displayed on the video screen 20 are not limited to order based on network-wide popularity. The controller U1 may order the identification values based on network popularity data, local play data, combinations thereof, or the like. A combination list utilizing both network popularity data and local play data may be determined based on a ratio of network popularity data to local play data applied by the controller U1. The ratio is preferably alterable so that, for example, a new jukebox device 12 initially displays lists ordered based solely on network popularity data, but as the controller U1 accumulates its own local play data, the ratio may be changed to reflect local popularity.

The server 14 may also further analyze the local play data uploaded from the jukebox devices 12 on the network 10 in order to determine subsets of popularity data. For example, the aggregated local play data may be analyzed to generate regional popularity data, genre-related popularity data, location-theme popularity data (e.g., all southwestern or country-style restaurants or bars), or the like. The jukebox devices 12 on the network may incorporate any of such popularity data received from the network 10 or combinations thereof.

Figure 7:
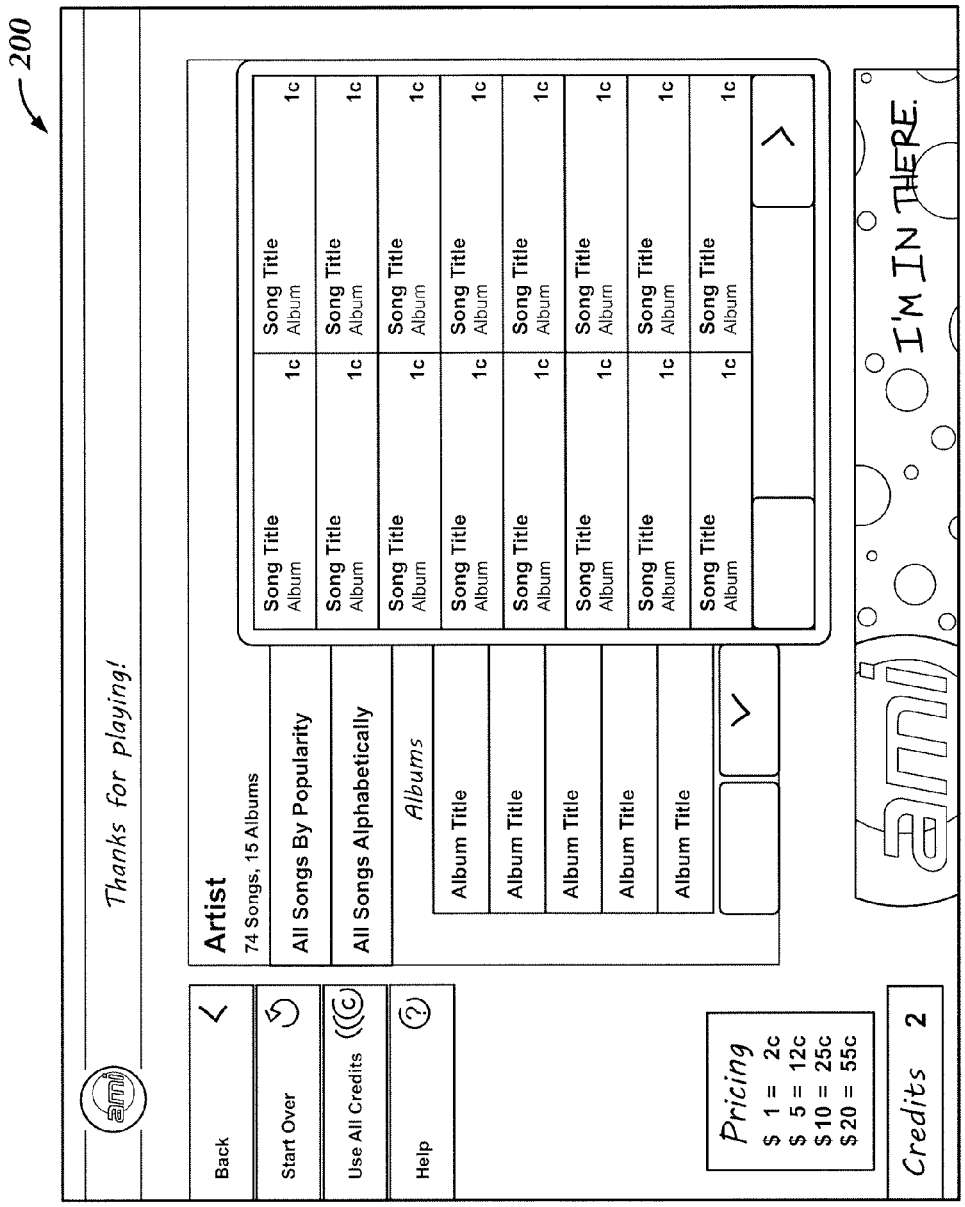
FIG. 7 is a screenshot of an artist sub-menu displayed on a jukebox device in accordance with a first preferred embodiment of the present invention.

FIG. 7 is a screenshot 200 illustrating that the presentation of identification values based on popularity values from the network popularity data may be utilized by the controller U1 for organization and presentation of further submenus when selecting music data sets. For example, once an artist is selected by a user, a listing of some or all other songs from that user-selected artist may be presented to the user. In screenshot 200, the songs are listed in order of the corresponding popularity values for songs of the user-selected artist.

Other sorting options may also be available, such as alphabetical, release date, or the like. The jukebox device 12 may also allow for convenient switching between sorting options. For example, as shown in FIG. 7, a user may conveniently toggle between ordering based on network popularity data and alphabetical order by simply tapping the touchscreen 24 in the appropriate location. A user may also select one of the album titles displayed. Once a user does so, a listing of some or all other songs from that user-selected album may be presented to the user. The songs are preferably listed in order of the corresponding popularity values for songs of the user-selected album. However, listing the songs in an order based on popularity values is one of a number of options of ordering. Other orderings are also possible, including by track order, alphabetically, and the like. Other lists and menus may similarly be operated by the controller U1 to aid the user in sorting or ordering music data sets for selection.

Figure 8:
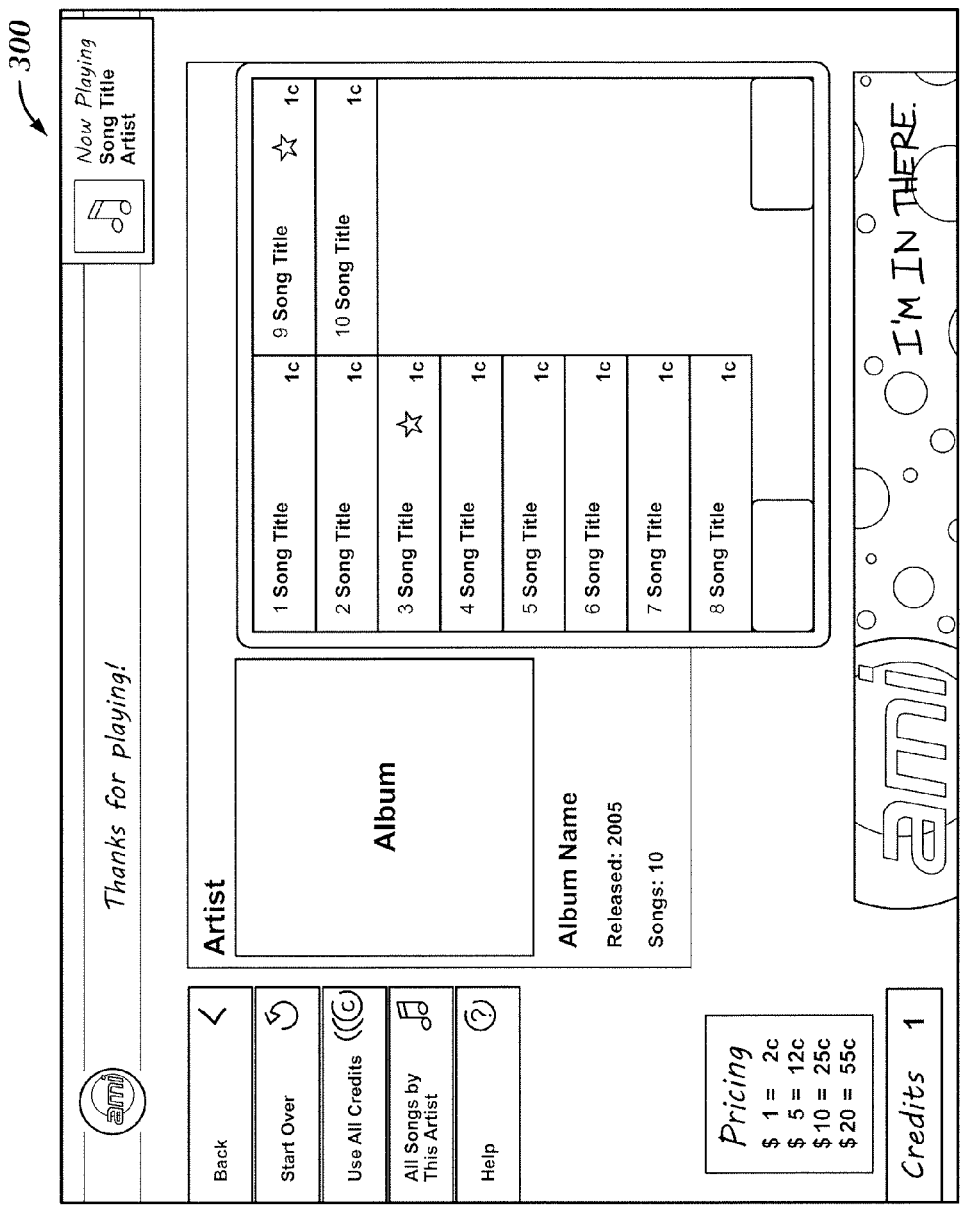
FIG. 8 is a screenshot of an album sub-menu displayed on a jukebox device in accordance with the first preferred embodiment of the present invention.

FIG. 8 is a screenshot 300 illustrating further use of the network popularity data by the controller U1 in enhancing the experience of the user. For example, the most popular music data sets in particular user-selected identification categories may be highlighted or emphasized to the user. In screenshot 300, the user has selected an album and a song listing of the album is displayed. A small number of the songs for the album, for example two or three, are highlighted as the most popular songs for the particular album selected. The highlighting may be in the form of shading, icons, static or dynamic images, or the like.

In a second preferred embodiment of the present invention, local affinity data from the plurality of jukebox devices 12 is compiled over the network 10 in order to determine music data sets that are most often selected together on a network-wide basis for providing recommendations to the user.

Establishment of one or more credits in a jukebox device 12 is considered by the controller U1 to be a "credit session." For every two music data sets that are selected and retrieved for play by the controller U1 during a common credit session, local affinity data is generated and stored by the controller U1. Specifically, the local affinity data includes identification of the music data sets selected from the plurality of available music data sets during a common credit session. The local affinity data preferably includes the number of times that two music data sets were selected for play within a common credit session. Further data is preferably also included, such as the number of times the associated music data sets were selected on-demand (downloaded), locally, as a result of promotions, or the like, and whether the two music data sets were selected as a result of an affinity recommendation, described below. Other information may also be included, such as the last date either music data set was selected, the last date the two music data sets were selected in a common credit session, or the like.

The local affinity data from each of the plurality of jukebox devices 12 on the network 10 is preferably uploadable to the network 10. Preferably, the local affinity data is uploaded to the network 10 from each of the plurality of jukebox devices 12 on the network 10 at regular intervals, such as daily, weekly, monthly, or the like. An exemplary plain text file format of local affinity data reporting is attached as Appendix 6. Data is aggregated at the server 14 in steps, preferably performed on a daily basis, although other intervals may be utilized. An exemplary pseudo-code for aggregating the local affinity data is attached as Appendix 7, wherein a step represents a configurable number of days and the minimum value of a step is "1."

Network affinity data is generated by the server 14 based upon the local affinity data uploaded to the network 10. Specifically, the network affinity data includes pairs of music data sets which have high affinity values as determined from the local affinity data received by the network 10 from the plurality of jukebox devices 12. Affinity values for each pair of music data sets are preferably calculated based on weighted factors (e.g., on-demand selections, local selections, or the like) detailed above. For example, a formula to calculate an affinity value may be as follows:

$$\text{Affinity value} = M4\_genre * M4\_popularity * \\ ((mod\_count * M4\_mod) + \\ (local\_count * M4\_local) + \\ (affinity\_count * M4\_affinity) - (kp\_count * (1 - M4\_kp)))$$

where M4_genre is "1" if the music data sets have different genres, otherwise use the M4 variable value if music data sets have the same genre; M4_popularity is "1" if neither of the music data sets are extremely popular, otherwise use the M4 variable value if one of the music data sets is an extremely popular song; M4_mod, M4_local, M4_kp, M4_affinity are M4 configurable variables for weights; and the counts are as described above (e.g., on-demand, local, or the like).

The network affinity data is preferably downloadable by each of the plurality of jukebox devices 12 on the network 10. In order to enable quick responses at the jukebox devices 12, network affinity data is preferably limited to the most relevant affinity values for each song. That is, only the top affiliations for each song are provided by the network server 14 back to the jukebox devices 12. An exemplary XML file containing network affinity data provided to the jukebox devices 12 is attached as Appendix 8. Delta files may also be created when changes are made to the network affinity date file.

As described above with the network popularity data, the jukebox devices 12 are notified by the server 14 when new network affinity data is available, and the jukebox devices 12 may request to download all of the network affinity data or a portion based on demand. A request for an entire file of network affinity data proceeds similarly to the sequence in FIG. 3. For on-demand requests, the sequence is similar to that shown in FIG. 5. Exemplary .xsd files for the request from the jukebox device 12 and the response from the server 14 are attached as Appendices 9 and 10 respectively.

Figure 9:
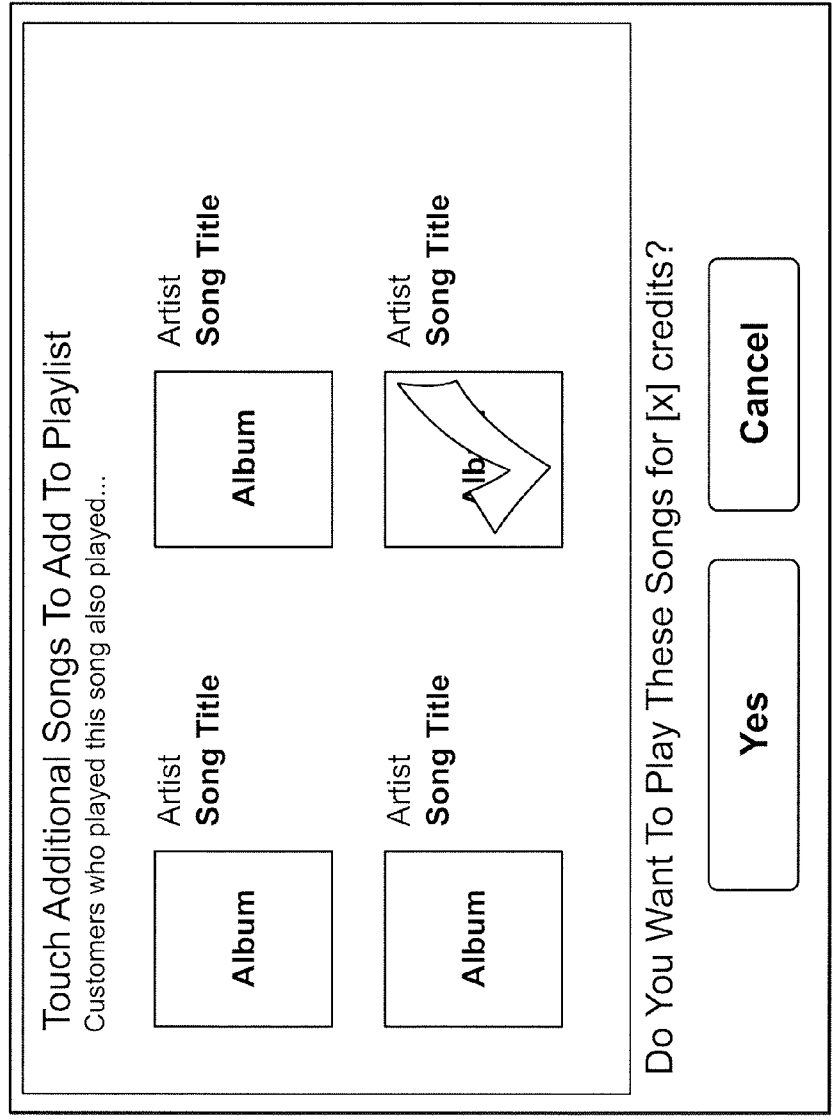
FIG. 9 is a screenshot of a suggestion page displayed on a jukebox device in accordance with a second preferred embodiment of the present invention.

Once a jukebox device 12 has stored network affinity data, the controller U1 is configured to retrieve for play a first music data set selected by a user. The video display 20 is then caused by the controller U1 to present an option to the user to select and play at least one second music data set from the network affinity data. For example, FIG. 9 is a screenshot 400 following a music data set selection by a user. Four additional music data sets are recommended to the user because the four illustrated music data sets were included in the network affinity data (meaning the respective affinity values were high). The user may then conveniently select one or more of the recommended additional music data sets for play. Identification values may be included with the recommendation, such as artist, album, or the like. Further information, such as cover art or the like is also preferably included. Although four music data sets are shown in FIG. 9, more or less may be provided, depending upon limits to the network affinity data.

In the event of a network disruption or disconnection, a jukebox device 12 may, as described above with respect to the network popularity data, continue to offer recommended additional music data sets, although limited only to music data sets available locally.

Figure 10:
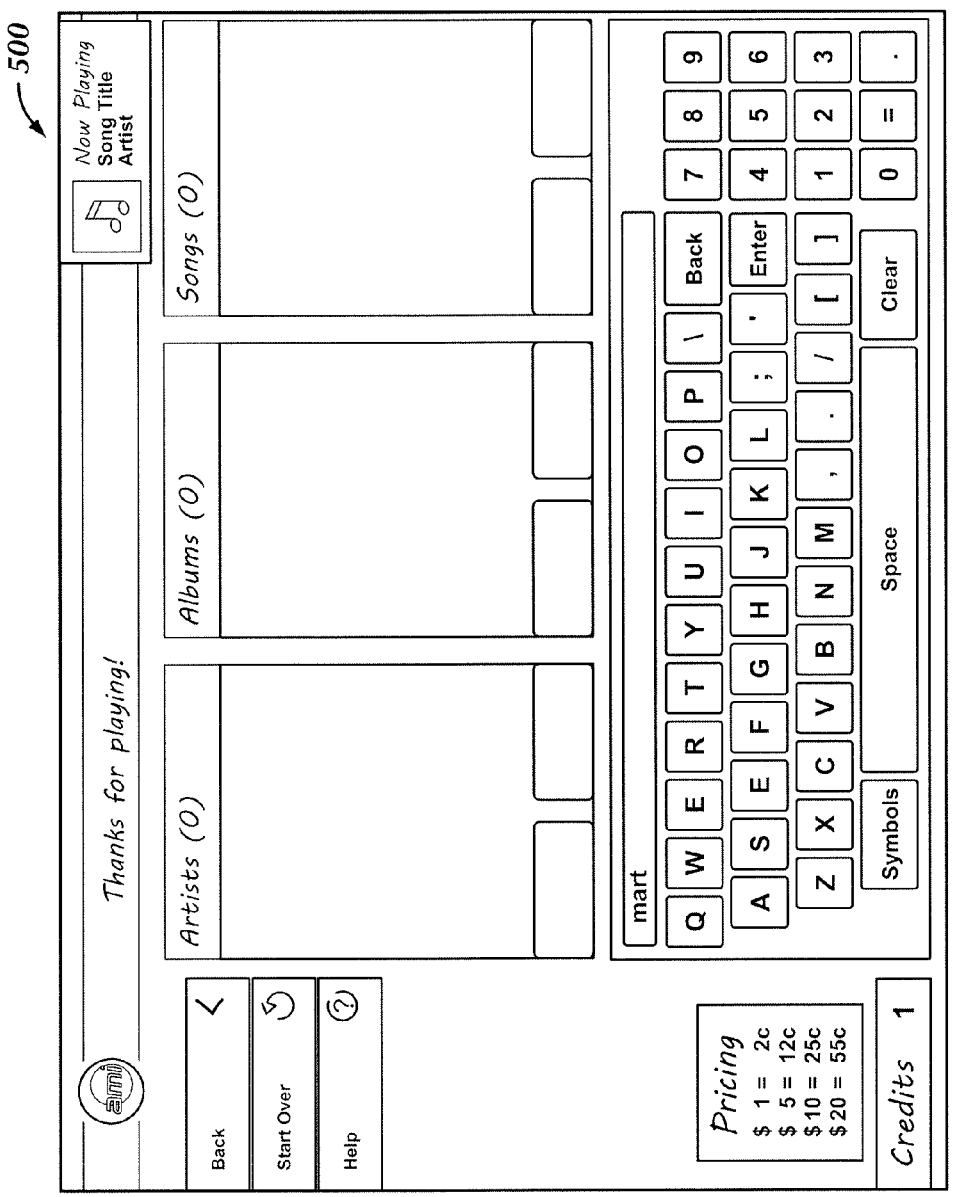
FIG. 10 is a screenshot of a blank search page displayed on a jukebox device in accordance with a third preferred embodiment of the present invention.

In a third preferred embodiment, searching for desired music data sets is enhanced by simultaneously searching multiple identification categories. Accordingly, a user may be presented with a search screen, such as screenshot 500 in FIG. 10. However, the search feature may be provided as part of other screens, such as a home page or the like. The controller U1 is configured to receive from the input component 24 a string of characters. For example, a user may enter a word, phrase, or fragment in the search box in screenshot 500 using the on-screen keyboard as part of the touchscreen video display 20. The controller U1 then searches for identification values containing the string of characters. Preferably the string of characters may be found at any portion of an identification value, such as at the beginning, middle, or end of the value. The controller U1 preferably searches simultaneously across the plurality of identification categories (e.g., song title, album title, artist name, and genre of music) for identification values containing the input string of characters.

Figure 11:
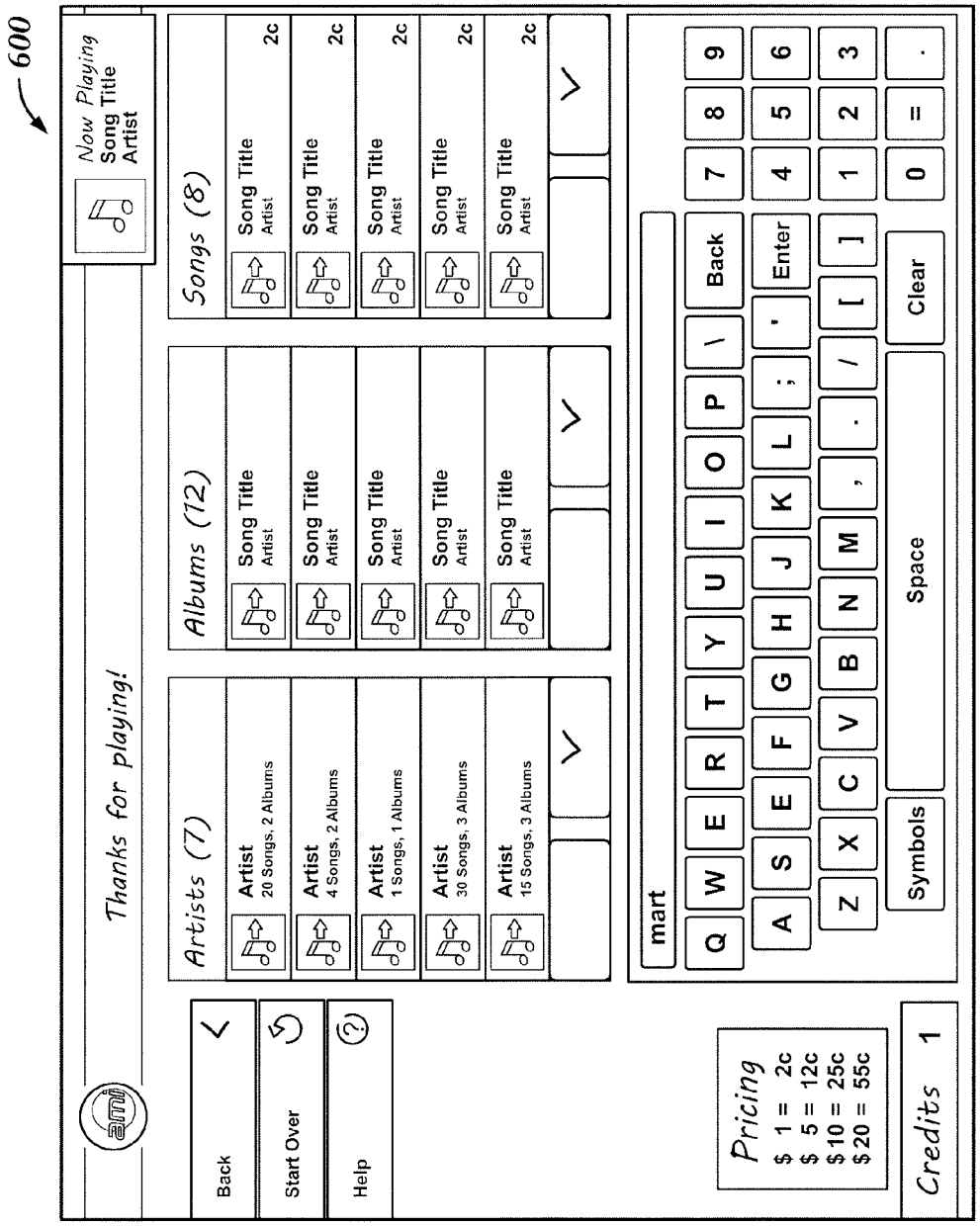
FIG. 11 is a screenshot of the search page of FIG. 10 following a search conducted on the jukebox device.

Once the controller U1 has obtained the search results, the video display 20 is caused to present, for each of the searched identification categories, the identification values containing the string of characters. For example, screenshot 600 in FIG. 11 shows that for the search term "mart," seven results were returned under the identification category "Artist," twelve results were returned for "Albums," and eight results were returned for "Songs." The results for each identification category may be ordered alphabetically or the like. Preferably, in accordance with the first embodiment of the present invention, the results are ordered according to network popularity data. Using the touchscreen or other input component 24 to choose one of the results enables the user to navigate to a corresponding page, such as an artist or album page listing songs, to select one or more music data sets for play.

In a fourth preferred embodiment, the jukebox device 12 may include collections that include music data sets based on multiple identification categories. For example, in FIG. 6, a number of collections are presented to the user toward the middle of screenshot 100. Each of the collections includes an identifying title. For each collection, as an example, songs, albums, and artists may all be included as part of the collection.

The controller U1 accordingly selects and retrieves all of the identification values associated with the collection for presentation to the user. Selection of an artist in a collection navigates to an artist page similar to screenshot 200 of FIG. 7. Selection of an album in a collection navigates to a page similar to screenshot 300 in FIG. 8. Selection of a song navigates to a confirmation page, which may include recommended music data sets, such as in screenshot 400 in FIG. 9.

Collections may be generated locally at a jukebox device 12, or may be generated at the server 14. Collections can be generated automatically based on collected data from the jukebox devices 12, from release dates, or the like.

Embodiments of the present invention also include methods of operating a jukebox device 12 in a network 10 as described above.

The jukebox device 12 may also include other functionality and features such as electronic game play, video jukebox, multimedia player, Internet browsing, broadcast media viewing, time based rental mode, non-prize tournaments, prize-based tournaments, head-to-head competitions, prize-based lotteries, ticket dispensing, prize dispensing, debit/credit card charging, phone card dispensing, e-mail, photography, placing customer orders, communicating with other jukebox devices, and the like.

The jukebox device 12 may also provide for remote or local access for accounting and/or bookkeeping purposes. The jukebox device 12 may include a local connector for uploading to a hand-held or portable computer or removable memory for receiving accounting or other data. The jukebox device 12 may include accounting and bookkeeping screens accessible by an operator through set up screens and/or through password protection.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

APPENDIX 1

```xml
<?xml version="1.0" encoding="UTF-8" standalone="no"?>
<xs:schema xmlns:xs="http://www.w3.org/2001/XMLSchema" elementFormDefault="qualified">
    <xs:import namespace="http://www.w3.org/XML/1998/namespace" />
    <xs:element name="TrackPopularityReq">
        <xs:annotation>
            <xs:documentation>Parent tag for all data in the file.</xs:documentation>
        </xs:annotation>
        <xs:complexType>
            <xs:sequence>
                <xs:element ref="RevisionID" minOccurs="1" maxOccurs="1" />
                <xs:choice minOccurs="1" maxOccurs="1">
                    <xs:annotation>
                        <xs:documentation>One of SendURL tag or SendData tag must be
                        present. </xs:documentation>
                    </xs:annotation>
                    <xs:element ref="SendURL" maxOccurs="1" />
                    <xs:element ref="SendData" maxOccurs="1" />
                </xs:choice>
            </xs:sequence>
        </xs:complexType>
    </xs:element>

<xs:element name="RevisionID" type="xs:string">
        <xs:annotation>
            <xs:documentation>The revision of the TrackPopularity file format.</xs:documentation>
        </xs:annotation>
    </xs:element>

<xs:element name="SendURL">
        <xs:annotation>
            <xs:documentation>If it is present will specify that the server has to send only the
            URL. </xs:documentation>
        </xs:annotation>
    </xs:element>

<xs:element name="SendData">
        <xs:annotation>
            <xs:documentation>
                If it is present specify that the server has to send the popularity data inside
the message body.
            </xs:documentation>
        </xs:annotation>
        <xs:complexType>
            <xs:choice minOccurs="0" maxOccurs="unbounded">
                <xs:element ref="Songs" maxOccurs="1" />
                <xs:element ref="Albums" maxOccurs="1" />
                <xs:element ref="Artists" maxOccurs="1" />
            </xs:choice>
        </xs:complexType>
    </xs:element>

<xs:element name="Songs">
        <xs:annotation>
            <xs:documentation>
                Parent tag under SendData. Specify that the response message has to contain
popularity info for songs. If no Songs, Albums or Artists tag is present the server will send all the
songs popularity info.
            </xs:documentation>
        </xs:annotation>
        <xs:complexType>
            <xs:attribute name="limit" use="optional">
                <xs:annotation>
                    <xs:documentation>
                        Optional attribute that specify the limit for the top popularity
songs that will be included in the server response.
                    </xs:documentation>
                </xs:annotation>
            </xs:attribute>
```

```
                </xs:complexType>
        </xs:element>

<xs:element name="Albums">
                <xs:annotation>
                        <xs:documentation>
                                Parent tag under SendData. Specify that the response message has to contain
popularity info for albums. If no Songs, Albums or Artists tag is present the server will send all the
songs popularity info.
                        </xs:documentation>
                </xs:annotation>
                <xs:complexType>
                        <xs:attribute name="limit" use="optional">
                                <xs:annotation>
                                        <xs:documentation>
                                                Optional attribute that specify the limit for the top popularity
albums that will be included in the server response.
                                        </xs:documentation>
                                </xs:annotation>
                        </xs:attribute>
                </xs:complexType>
        </xs:element>

<xs:element name="Artists">
                <xs:annotation>
                        <xs:documentation>
                                Parent tag under SendData. Specify that the response message has to contain
popularity info for artists. If no Songs, Albums or Artists tag is present the server will send all the
songs popularity info.
                        </xs:documentation>
                </xs:annotation>
                <xs:complexType>
                        <xs:attribute name="limit" use="optional">
                                <xs:annotation>
                                        <xs:documentation>
                                                Optional attribute that specify the limit for the top popularity
artists that will be included in the server response.
                                        </xs:documentation>
                                </xs:annotation>
                        </xs:attribute>
                </xs:complexType>
        </xs:element>
</xs:schema>
```

Example 1 – request URL

```
<?xml version="1.0" encoding="UTF-8"?>
<!--Sample XML file -->
<TrackPopularityReq xsi:noNamespaceSchemaLocation="TrackPopularityReq.xsd" xmlns:xsi="http://www.w3.org/2001/XMLSchema-instance">
        <RevisionID>String</RevisionID>
        <SendURL />
</TrackPopularityReq>
```

Example 2 – request Data

```
<?xml version="1.0" encoding="UTF-8"?>
<!--Sample XML file -->
<TrackPopularityReq xsi:noNamespaceSchemaLocation="TrackPopularityReq.xsd" xmlns:xsi="http://www.w3.org/2001/XMLSchema-instance">
        <RevisionID>String</RevisionID>
        <SendData>
                <Songs limit="123"/>
                <Albums limit="4578"/>
        </SendData>
</TrackPopularityReq>
```

APPENDIX 2

```xml
<?xml version="1.0" encoding="UTF-8" standalone="no"?>
<xs:schema xmlns:xs="http://www.w3.org/2001/XMLSchema" elementFormDefault="qualified">
    <xs:import namespace="http://www.w3.org/XML/1998/namespace" />
    <xs:element name="TrackPopularity">
        <xs:annotation>
            <xs:documentation>Parent tag for all data in the file.</xs:documentation>
        </xs:annotation>
        <xs:complexType>
            <xs:sequence>
                <xs:element ref="RevisionID" minOccurs="1" maxOccurs="1" />
                <xs:element ref="DataVersion" minOccurs="1" maxOccurs="1" />
                <xs:choice minOccurs="1" maxOccurs="1">
                    <xs:annotation>
                        <xs:documentation>
                            One of PopularityURLFile tag or PopularityData tag must be present.
                        </xs:documentation>
                    </xs:annotation>
                    <xs:element ref="PopularityURLFile" maxOccurs="1" />
                    <xs:element ref="PopularityData" maxOccurs="1" />
                </xs:choice>
            </xs:sequence>
        </xs:complexType>
    </xs:element>

<xs:element name="RevisionID" type="xs:string">
        <xs:annotation>
            <xs:documentation>The revision of the TrackPopularity file format.</xs:documentation>
        </xs:annotation>
    </xs:element>

<xs:element name="DataVersion" type="xs:string">
        <xs:annotation>
            <xs:documentation>The version number of the Track Popularity Data.</xs:documentation>
        </xs:annotation>
    </xs:element>

<xs:element name="PopularityURLFile">
        <xs:annotation>
            <xs:documentation>Contains info about the URL that points to popularity data file.
            </xs:documentation>
        </xs:annotation>
        <xs:complexType>
            <xs:attribute name="URL">
                <xs:annotation>
                    <xs:documentation>
                        Specify the URL for the file that contains relevance popularity data.
                    </xs:documentation>
                </xs:annotation>
            </xs:attribute>
        </xs:complexType>
    </xs:element>

<xs:element name="PopularityData">
        <xs:annotation>
            <xs:documentation>Parent tag for popularity data info.</xs:documentation>
        </xs:annotation>
        <xs:complexType>
            <xs:choice minOccurs="1" maxOccurs="unbounded">
                <xs:element ref="Songs" maxOccurs="1" />
                <xs:element ref="Albums" maxOccurs="1" />
                <xs:element ref="Artists" maxOccurs="1" />
            </xs:choice>
        </xs:complexType>
    </xs:element>

<xs:element name="Songs">
```

```xml
<xs:annotation>
    <xs:documentation>
        Parent tag under PopularityData that contains popularity info for songs.
    </xs:documentation>
</xs:annotation>
<xs:complexType>
    <xs:sequence minOccurs="1" maxOccurs="unbounded">
        <xs:element ref="SP" />
    </xs:sequence>
    <xs:attribute name="limit" use="optional">
        <xs:annotation>
            <xs:documentation>Specify if a limit has been used for songs popularity
            data. </xs:documentation>
        </xs:annotation>
    </xs:attribute>
</xs:complexType>
</xs:element>

<xs:element name="SP">
    <xs:annotation>
        <xs:documentation>Parent tag under Songs tag, which contains popularity info for a
        song. </xs:documentation>
    </xs:annotation>
    <xs:complexType>
        <xs:attribute name="id" type="xs:int" />
        <xs:attribute name="val" type="xs:int" />
    </xs:complexType>
</xs:element>

<xs:element name="Albums">
    <xs:annotation>
        <xs:documentation>
            Parent tag under PopularityData that contains popularity info for albums.
        </xs:documentation>
    </xs:annotation>
    <xs:complexType>
        <xs:sequence minOccurs="1" maxOccurs="unbounded">
            <xs:element ref="ALP" />
        </xs:sequence>
        <xs:attribute name="limit" use="optional">
            <xs:annotation>
                <xs:documentation>Specify if a limit has been used for albums
                popularity data. </xs:documentation>
            </xs:annotation>
        </xs:attribute>
    </xs:complexType>
</xs:element>

<xs:element name="ALP">
    <xs:annotation>
        <xs:documentation>
            Parent tag under Albums tag, which contains popularity info for an album.
        </xs:documentation>
    </xs:annotation>
    <xs:complexType>
        <xs:attribute name="id" type="xs:int" />
        <xs:attribute name="val" type="xs:int" />
    </xs:complexType>
</xs:element>

<xs:element name="Artists">
    <xs:annotation>
        <xs:documentation>
            Parent tag under PopularityData that contains popularity info for artists.
        </xs:documentation>
    </xs:annotation>
    <xs:complexType>
        <xs:sequence minOccurs="1" maxOccurs="unbounded">
            <xs:element ref="ARP" />
        </xs:sequence>
        <xs:attribute name="limit" use="optional">
```

```
                    <xs:annotation>
                        <xs:documentation>Specify if a limit has been used for artists
                            popularity data. </xs:documentation>
                    </xs:annotation>
                </xs:attribute>
            </xs:complexType>
        </xs:element>

<xs:element name="ARP">
            <xs:annotation>
                <xs:documentation>
                    Parent tag under Artists tag, which contains popularity info for an artist.
                </xs:documentation>
            </xs:annotation>
            <xs:complexType>
                <xs:attribute name="id" type="xs:int" />
                <xs:attribute name="val" type="xs:int" />
            </xs:complexType>
        </xs:element>

</xs:schema>
```

Example 1 – URL response

```
<?xml version="1.0" encoding="UTF-8"?>
<!--Sample XML file -->
<TrackPopularity xsi:noNamespaceSchemaLocation="TrackPopularity.xsd" xmlns:xsi="http://www.w3.org/2001/XMLSchema-instance">
    <RevisionID>String</RevisionID>
    <DataVersion>String</DataVersion>
    <PopularityURLFile URL="url to file..."/>
</TrackPopularity>
```

Example 2 – Data response

```
<?xml version="1.0" encoding="UTF-8"?>
<!--Sample XML file -->
<TrackPopularity xsi:noNamespaceSchemaLocation="TrackPopularity.xsd" xmlns:xsi="http://www.w3.org/2001/XMLSchema-instance">
    <RevisionID>String</RevisionID>
    <DataVersion>String</DataVersion>
    <PopularityData>
        <Songs limit="123">
            <SP id="1" val="1245"/>
            <SP id="2" val="145"/>
        </Songs>
        <Albums limit="123">
            <ALP id="1" val="1245"/>
            <ALP id="2" val="145"/>
            <ALP id="3" val="100"/>
            <ALP id="4" val="30"/>
        </Albums>
    </PopularityData>
</TrackPopularity>
```

APPENDIX 3

```
<?xml version="1.0" ?>
<SoftwareVersion>
    <software version="2.2.9" type="IDL" group="production" />
    <connection type="dialup" number="616-123-4546" version="12" />
    <trackcatalog version="5" type="full" />
    <trackpopularity version="14" />
    <harddrive id=" F429H967295A3D7" />
</SoftwareVersion>
```

APPENDIX 4

```xml
<?xml version="1.0" encoding="UTF-8" standalone="no"?>
<xs:schema xmlns:xs="http://www.w3.org/2001/XMLSchema" elementFormDefault="qualified">
    <xs:import namespace="http://www.w3.org/XML/1998/namespace" />
    <xs:element name="OnDemandPopularityRqo">
        <xs:annotation>
            <xs:documentation>Parent tag for all data in the file.</xs:documentation>
        </xs:annotation>
        <xs:complexType>
            <xs:sequence>
                <xs:element ref="RevisionID" minOccurs="1" maxOccurs="1" />
                <xs:choice minOccurs="1" maxOccurs="1">
                    <xs:annotation>
                        <xs:documentation>
                            One of SpecificGenres, SpecificArtists or SpecificAlbums tag must be present.
                        </xs:documentation>
                    </xs:annotation>
                    <xs:element ref="SpecificGenres" maxOccurs="1" />
                    <xs:element ref="SpecificArtists" maxOccurs="1" />
                    <xs:element ref="SpecificAlbums" maxOccurs="1" />
                </xs:choice>
            </xs:sequence>
        </xs:complexType>
    </xs:element>

<xs:element name="RevisionID" type="xs:string">
        <xs:annotation>
            <xs:documentation>The revision of the OnDemandPopularity format</xs:documentation>
        </xs:annotation>
    </xs:element>

<xs:element name="SpecificGenres">
        <xs:annotation>
            <xs:documentation>
                Specify that requested popularity data must be relevant to some specific genres.
                One of RequestSongs, RequestAlbums or RequestArtists must be present.
            </xs:documentation>
        </xs:annotation>
        <xs:complexType>
            <xs:sequence minOccurs="1" maxOccurs="1">
                <xs:element ref="IdList" minOccurs="1" maxOccurs="1" />
                <xs:choice minOccurs="1" maxOccurs="1">
                    <xs:element ref="RequestSongs" minOccurs="0" maxOccurs="1" />
                    <xs:element ref="RequestAlbums" minOccurs="0" maxOccurs="1" />
                    <xs:element ref="RequestArtists" minOccurs="0" maxOccurs="1" />
                </xs:choice>
            </xs:sequence>
        </xs:complexType>
    </xs:element>

<xs:element name="SpecificArtists">
        <xs:annotation>
            <xs:documentation>
                Specify that requested popularity data must be relevant to some specific artists.
                One of RequestSongs or RequestAlbums must be present.
            </xs:documentation>
        </xs:annotation>
        <xs:complexType>
            <xs:sequence minOccurs="1" maxOccurs="1">
                <xs:element ref="IdList" minOccurs="1" maxOccurs="1" />
                <xs:choice minOccurs="1" maxOccurs="1">
                    <xs:element ref="RequestSongs" minOccurs="0" maxOccurs="1" />
                    <xs:element ref="RequestAlbums" minOccurs="0" maxOccurs="1" />
                </xs:choice>
            </xs:sequence>
        </xs:complexType>
    </xs:element>
```

```
<xs:element name="SpecificAlbums">
    <xs:annotation>
        <xs:documentation>
            Specify that requested popularity data must be relevant to some specific albums.
RequestSongs tag must be present.
        </xs:documentation>
    </xs:annotation>
    <xs:complexType>
        <xs:sequence minOccurs="1" maxOccurs="1">
            <xs:element ref="IdList" minOccurs="1" maxOccurs="1" />
            <xs:element ref="RequestSongs" minOccurs="1" maxOccurs="1" />
        </xs:sequence>
    </xs:complexType>
</xs:element>

<xs:element name="RequestSongs">
    <xs:annotation>
        <xs:documentation>Identify that the jukebox wants songs popularity info.</xs:documentation>
    </xs:annotation>
    <xs:complexType>
        <xs:attribute name="limit" use="optional">
            <xs:annotation>
                <xs:documentation>An optional limit for amount of data reported.
                </xs:documentation>
            </xs:annotation>
        </xs:attribute>
    </xs:complexType>
</xs:element>

<xs:element name="RequestAlbums">
    <xs:annotation>
        <xs:documentation>Identify that the jukebox wants albums popularity info.</xs:documentation>
    </xs:annotation>
    <xs:complexType>
        <xs:attribute name="limit" use="optional">
            <xs:annotation>
                <xs:documentation>An optional limit for amount of data reported.
                </xs:documentation>
            </xs:annotation>
        </xs:attribute>
    </xs:complexType>
</xs:element>

<xs:element name="RequestArtists">
    <xs:annotation>
        <xs:documentation>Identify that the jukebox wants artists popularity info.</xs:documentation>
    </xs:annotation>
    <xs:complexType>
        <xs:attribute name="limit" use="optional">
            <xs:annotation>
                <xs:documentation>An optional limit for amount of data reported.
                </xs:documentation>
            </xs:annotation>
        </xs:attribute>
    </xs:complexType>
</xs:element>

<xs:element name="IdList">
    <xs:annotation>
        <xs:documentation>Parent tag that encapsulate a list of specific ids.</xs:documentation>
    </xs:annotation>
    <xs:complexType>
        <xs:sequence minOccurs="1" maxOccurs="unbounded">
            <xs:element name="Id" minOccurs="1" maxOccurs="unbounded">
                <xs:annotation>
                    <xs:documentation>
                        Parent tag under IdList. Includes info for one specific entity.
```

```
                </xs:documentation>
            </xs:annotation>
            <xs:complexType>
                <xs:attribute name="val" use="required" type="xs:int" />
            </xs:complexType>
        </xs:element>
    </xs:sequence>
</xs:complexType>
</xs:element>

</xs:schema>
```

Example 1 – Request Songs for specific genres

```
<?xml version="1.0" encoding="UTF-8"?>
<!--Sample XML file -->
<OnDemandPopularityReq xsi:noNamespaceSchemaLocation="OnDemandPopularityReq.xsd"
xmlns:xsi="http://www.w3.org/2001/XMLSchema-instance">
    <RevisionID>String</RevisionID>
    <SpecificGenres>
        <IdList>
            <Id val="100"/>
            <Id val="103"/>
            <Id val="105"/>
            <Id val="54"/>
        </IdList>
        <RequestSongs limit="4567"/>
    </SpecificGenres>
</OnDemandPopularityReq>
```

Example 2 – Request Albums for specific artists

```
<?xml version="1.0" encoding="UTF-8"?>
<!--Sample XML file -->
<OnDemandPopularityReq xsi:noNamespaceSchemaLocation="OnDemandPopularityReq.xsd"
xmlns:xsi="http://www.w3.org/2001/XMLSchema-instance">
    <RevisionID>String</RevisionID>
    <SpecificArtists>
        <IdList>
            <Id val="12"/>
            <Id val="547"/>
            <Id val="64"/>
            <Id val="102"/>
        </IdList>
        <RequestAlbums limit="10"/>
    </SpecificArtists>
</OnDemandPopularityReq>
```

Example 3 – Request Songs for specific artists

```
<?xml version="1.0" encoding="UTF-8"?>
<!--Sample XML file -->
<OnDemandPopularityReq xsi:noNamespaceSchemaLocation="OnDemandPopularityReq.xsd"
xmlns:xsi="http://www.w3.org/2001/XMLSchema-instance">
    <RevisionID>String</RevisionID>
    <SpecificArtists>
        <IdList>
            <Id val="457"/>
        </IdList>
        <RequestSongs limit="12"/>
    </SpecificArtists>
</OnDemandPopularityReq>
```

APPENDIX 5

```xml
<?xml version="1.0" encoding="UTF-8" standalone="no"?>
<xs:schema xmlns:xs="http://www.w3.org/2001/XMLSchema" elementFormDefault="qualified">
    <xs:import namespace="http://www.w3.org/XML/1998/namespace" />
    <xs:element name="OnDemandPopularity">
        <xs:annotation>
            <xs:documentation>Parent tag for all data in the file.</xs:documentation>
        </xs:annotation>
        <xs:complexType>
            <xs:sequence>
                <xs:element ref="RevisionID" minOccurs="1" maxOccurs="1" />
                <xs:element ref="DataVersion" minOccurs="1" maxOccurs="1" />
                <xs:choice minOccurs="1" maxOccurs="1">
                    <xs:annotation>
                        <xs:documentation>
                            One of the GenreList, ArtistList or AlbumList tags must be present.
                        </xs:documentation>
                    </xs:annotation>
                    <xs:element ref="GenreList" maxOccurs="1" />
                    <xs:element ref="ArtistList" maxOccurs="1" />
                    <xs:element ref="AlbumList" maxOccurs="1" />
                </xs:choice>
            </xs:sequence>
        </xs:complexType>
    </xs:element>

<xs:element name="RevisionID" type="xs:string">
        <xs:annotation>
            <xs:documentation>The revision of the OnDemandPopularity format</xs:documentation>
        </xs:annotation>
    </xs:element>

<xs:element name="DataVersion" type="xs:string">
        <xs:annotation>
            <xs:documentation>The version number of the Track Popularity Data.</xs:documentation>
        </xs:annotation>
    </xs:element>

<xs:element name="GenreList">
        <xs:annotation>
            <xs:documentation>The server return popularity information grouped by genres.</xs:documentation>
        </xs:annotation>
        <xs:complexType>
            <xs:sequence minOccurs="1" maxOccurs="unbounded">
                <xs:element name="Genre" minOccurs="1" maxOccurs="unbounded">
                    <xs:annotation>
                        <xs:documentation>
                            Parent tag under GenreList. Includes popularity data and info for a specific genre.
                        </xs:documentation>
                    </xs:annotation>
                    <xs:complexType>
                        <xs:choice minOccurs="1" maxOccurs="1">
                            <xs:element ref="Songs" minOccurs="0" maxOccurs="1" />
                            <xs:element ref="Albums" minOccurs="0" maxOccurs="1" />
                            <xs:element ref="Artists" minOccurs="0" maxOccurs="1" />
                        </xs:choice>
                        <xs:attribute name="id" use="required" type="xs:int" />
                    </xs:complexType>
                </xs:element>
            </xs:sequence>
        </xs:complexType>
    </xs:element>

<xs:element name="ArtistList">
        <xs:annotation>
```

```
                        <xs:documentation>The server return popularity information grouped by
artists.</xs:documentation>
            </xs:annotation>
            <xs:complexType>
                <xs:sequence minOccurs="1" maxOccurs="unbounded">
                    <xs:element name="Artist" minOccurs="1" maxOccurs="unbounded">
                        <xs:annotation>
                            <xs:documentation>
                                    Parent tag under ArtistList. Contain popularity
information grouped by/for a specific artist.
                            </xs:documentation>
                        </xs:annotation>
                        <xs:complexType>
                            <xs:choice minOccurs="1" maxOccurs="1">
                                <xs:element ref="Songs" minOccurs="0" maxOccurs="1" />
                                <xs:element ref="Albums" minOccurs="0" maxOccurs="1" />
                            </xs:choice>
                            <xs:attribute name="id" use="required" type="xs:int" />
                        </xs:complexType>
                    </xs:element>
                </xs:sequence>
            </xs:complexType>
    </xs:element>

<xs:element name="AlbumList">
            <xs:annotation>
                <xs:documentation>The server return popularity information grouped by
albums.</xs:documentation>
            </xs:annotation>
            <xs:complexType>
                <xs:sequence minOccurs="1" maxOccurs="unbounded">
                    <xs:element name="Album" minOccurs="1" maxOccurs="unbounded">
                        <xs:annotation>
                            <xs:documentation>
                                    Parent tag under ArtistList. Contain popularity
information grouped by/for a specific album.
                            </xs:documentation>
                        </xs:annotation>
                        <xs:complexType>
                            <xs:sequence minOccurs="1" maxOccurs="1">
                                <xs:element ref="Songs" minOccurs="1" maxOccurs="1" />
                            </xs:sequence>
                            <xs:attribute name="id" use="required" type="xs:int" />
                        </xs:complexType>
                    </xs:element>
                </xs:sequence>
            </xs:complexType>
    </xs:element>

<xs:element name="Songs">
            <xs:annotation>
                <xs:documentation>Contains popularity info for songs.</xs:documentation>
            </xs:annotation>
            <xs:complexType>
                <xs:sequence minOccurs="1" maxOccurs="unbounded">
                    <xs:element ref="SP" />
                </xs:sequence>
                <xs:attribute name="limit" use="optional">
                    <xs:annotation>
                        <xs:documentation>Specify if a limit has been used for songs popularity
                        data. </xs:documentation>
                    </xs:annotation>
                </xs:attribute>
            </xs:complexType>
    </xs:element>

<xs:element name="SP">
            <xs:annotation>
                <xs:documentation>Parent tag under Songs tag, which contains popularity info for a song.
                </xs:documentation>
            </xs:annotation>
```

```xml
        <xs:complexType>
            <xs:attribute name="id" type="xs:int" />
            <xs:attribute name="val" type="xs:int" />
        </xs:complexType>
</xs:element>

<xs:element name="Albums">
        <xs:annotation>
            <xs:documentation>Contains popularity info for albums.</xs:documentation>
        </xs:annotation>
        <xs:complexType>
            <xs:sequence minOccurs="1" maxOccurs="unbounded">
                <xs:element ref="ALP" />
            </xs:sequence>
            <xs:attribute name="limit" use="optional">
                <xs:annotation>
                    <xs:documentation>Specify if a limit has been used for albums popularity
                        data. </xs:documentation>
                </xs:annotation>
            </xs:attribute>
        </xs:complexType>
</xs:element>

<xs:element name="ALP">
        <xs:annotation>
            <xs:documentation>
                Parent tag under Albums tag, which contains popularity info for an album.
            </xs:documentation>
        </xs:annotation>
        <xs:complexType>
            <xs:attribute name="id" type="xs:int" />
            <xs:attribute name="val" type="xs:int" />
        </xs:complexType>
</xs:element>

<xs:element name="Artists">
        <xs:annotation>
            <xs:documentation>Contains popularity info for artists.</xs:documentation>
        </xs:annotation>
        <xs:complexType>
            <xs:sequence minOccurs="1" maxOccurs="unbounded">
                <xs:element ref="ARP" />
            </xs:sequence>
            <xs:attribute name="limit" use="optional">
                <xs:annotation>
                    <xs:documentation>Specify if a limit has been used for artists popularity
                        data. </xs:documentation>
                </xs:annotation>
            </xs:attribute>
        </xs:complexType>
</xs:element>

<xs:element name="ARP">
        <xs:annotation>
            <xs:documentation>
                Parent tag under Artists tag, which contains popularity info for an artist.
            </xs:documentation>
        </xs:annotation>
        <xs:complexType>
            <xs:attribute name="id" type="xs:int" />
            <xs:attribute name="val" type="xs:int" />
        </xs:complexType>
</xs:element>

</xs:schema>
```

Example 1 – Response songs for specific genres

```xml
<?xml version="1.0" encoding="UTF-8"?>
<!--Sample XML file -->
```

```xml
<OnDemandPopularity xsi:noNamespaceSchemaLocation="OnDemandPopuarity.xsd" xmlns:xsi="http://www.w3.org/2001/XMLSchema-instance">
	<RevisionID>String</RevisionID>
	<DataVersion>String</DataVersion>
	<GenreList>
		<Genre id="100">
			<Songs limit="6">
				<SP id="1" val="1231"/>
				<SP id="2" val="123"/>
				<SP id="3" val="122"/>
				<SP id="4" val="13"/>
				<SP id="5" val="10"/>
				<SP id="6" val="6"/>
			</Songs>
		</Genre>
		<Genre id="103">
			<Songs limit="4">
				<SP id="10" val="123"/>
				<SP id="31" val="122"/>
				<SP id="34" val="13"/>
				<SP id="25" val="10"/>
			</Songs>
		</Genre>
		<Genre id="105">
			<Songs limit="5">
				<SP id="2" val="123"/>
				<SP id="36" val="122"/>
				<SP id="7" val="13"/>
				<SP id="8" val="13"/>
				<SP id="10" val="10"/>
			</Songs>
		</Genre>
		<Genre id="54">
			<Songs limit="2">
				<SP id="1" val="12454"/>
				<SP id="3" val="6545"/>
			</Songs>
		</Genre>
	</GenreList>
</OnDemandPopularity>
```

APPENDIX 6

```xml
<?xml version="1.0" ?>
<PlayDetail>
  <RevisionID>1.0</RevisionID>
  <harddrive id="AHDE2YT96XFX95" />
  <JukeboxID>00-0B-CD-16-68-D1</JukeboxID>
  <Scope StartDate="2004-02-16T08:34:19" EndDate="2004-02-16T08:49:19"
        IncludeExported="False" />
  <List>
    <Play JukeboxID="00-50-ba-cc-6c-7e" Type="100" SongId="2375" PaidCredits="1"
        FreeCredits="1" IsMod="1" Rate="54830" Result="100" Selected="2004-02-16T08:44:14"
        Played="2004-02-16T08:44:16" Finished="2004-02-16T08:48:04" CreditSessionId="2004-
        02-16T08:43:47" />
    <Play JukeboxID="00-50-ba-cc-6c-7e" Type="100" SongId="75092" PaidCredits="1"
        Result="100" SelectionCode="100" Selected="2004-02-16T08:44:25" Played="2004-02-
        16T08:48:06" Finished="2004-02-16T08:51:22" CreditSessionId="2004-02-16T08:43:47"
        />
    <Play JukeboxID="00-50-ba-cc-6c-7e" Type="100" SongId="4265" PaidCredits="2"
        FreeCredits="0" IsMsf="1" Result="300" SelectionCode="200" Selected="2004-02-
        16T08:45:06" Played="2004-02-16T08:51:24" Finished="2004-02-16T08:54:53"
        CreditSessionId="2004-02-16T08:43:47" />
    <Play JukeboxID="00-50-ba-cc-6c-7e" Type="700" SongId="250991" PaidCredits="0"
        FreeCredits="0" Result="100" SelectionCode="200" Source="00-02-6b-0a-38-6c"
        Selected="2004-02-16T08:52:32" Played="2004-02-16T08:54:55" Finished="2004-02-
        16T08:57:29" />
  </List>
</PlayDetail>
```

APPENDIX 7

```
for every step
    take play detail event data for current step with credit session not null, type code = 100 or 700 and song not null
    for every combination between two songs (s1, s2) that are in the same credit session for the same jukebox
        use key = (s1, s2) if s1 < s2 or key = (s2, s1) if s1 > s2
        if the key exists in the affinity data
            update existing row with:
            if s1.is_mod then
                set mod_count = mod_count + 1
            else
                set local_count = local_count + 1
            end if
            if s1.is_kp then
                set kp_count = kp_count + 1
            end if
            if s1.is_affinity then
                set affinity_count = affinity_count + 1
            end if
            if s2.is_mod then
                set mod_count = mod_count + 1
            else
                set local_count = local_count + 1
            end if
            if s2.is_kp then
                set kp_count = kp_count + 1
            end if
            if s2.is_affinity then
                set affinity_count = affinity_count + 1
            end if
        else
            insert a new row for key with:
            if s1.is_mod then
                set mod_count = 1
            else
                set local_count = 1
            end if
            if s1.is_kp then
                set kp_count = 1
            end if
            if s1.is_affinity then
                set affinity_count = 1
            end if
            if s2.is_mod then
                set mod_count = mod_count + 1
            else
                set local_count = local_count + 1
            end if
            if s2.is_kp then
                set kp_count = kp_count + 1
            end if
            if s2.is_affinity then
                set affinity_count = affinity_count + 1
            end if
    end for
end for
```

APPENDIX 8

```xml
<?xml version="1.0" encoding="UTF-8" standalone="no"?>
<xs:schema xmlns:xs="http://www.w3.org/2001/XMLSchema" elementFormDefault="qualified">
    <xs:import namespace="http://www.w3.org/XML/1998/namespace" />
    <xs:element name="NetworkAffinityData">
        <xs:complexType>
            <xs:sequence>
                <xs:element name="RevisionID" type="xs:string" minOccurs="1" maxOccurs="1" />
                <xs:element name="DataVersion" type="xs:string" minOccurs="1" maxOccurs="1" />
                <xs:element ref="SongList" minOccurs="1" maxOccurs="1" />
            </xs:sequence>
        </xs:complexType>
    </xs:element>
    <xs:element name="SongList">
        <xs:complexType>
            <xs:sequence>
                <xs:element ref="Song" minOccurs="1" maxOccurs="n" />
            </xs:sequence>
        </xs:complexType>
    </xs:element>
    <xs:element name="Song">
        <xs:complexType>
            <xs:sequence>
                <xs:element ref="AffinitySong" minOccurs="1" maxOccurs="n" />
            </xs:sequence>
            <xs:attribute name="id" type="xs:integer" use="required" />
        </xs:complexType>
    </xs:element>
    <xs:element name="AffinitySong">
        <xs:complexType>
            <xs:attribute name="id" type="xs:integer" use="required" />
        </xs:complexType>
    </xs:element>
</xs:schema>
```

Example 1:

```xml
<?xml version="1.0" encoding="UTF-8" standalone="no"?>
<NetworkAffinityData>
    <RevisionID>1</RevisionID>
    <DataVersion>1</DataVersion>
    <SongList>
        <Song id="123543">
            <AffinitySong id="123543" />
            <AffinitySong id="125412" />
            <AffinitySong id="726636" />
            <AffinitySong id="563124" />
            <AffinitySong id="267754" />
            <AffinitySong id="547234" />
            <AffinitySong id="754723" />
            <AffinitySong id="123543" />
            <AffinitySong id="125412" />
            <AffinitySong id="726636" />
        </Song>
        <Song id="15643">
            <AffinitySong id="123543" />
            <AffinitySong id="125412" />
            <AffinitySong id="726636" />
            <AffinitySong id="563124" />
            <AffinitySong id="267754" />
            <AffinitySong id="547234" />
            <AffinitySong id="125412" />
            <AffinitySong id="726636" />
        </Song>
        <!-- ... -->
        <Song id="89723">
            <AffinitySong id="123543" />
            <AffinitySong id="125412" />
```

```
                <AffinitySong id="726636" />
                <AffinitySong id="563124" />
                <AffinitySong id="267754" />
                <AffinitySong id="547234" />
                <AffinitySong id="125412" />
                <AffinitySong id="726636" />
            </Song>
        </SongList>
</NetworkAffinityData>
```

APPENDIX 9

```xml
<?xml version="1.0" encoding="UTF-8" standalone="no"?>
<xs:schema xmlns:xs="http://www.w3.org/2001/XMLSchema" elementFormDefault="qualified">
    <xs:import namespace="http://www.w3.org/XML/1998/namespace" />
    <xs:element name="OnDemandSongAffinityDataRQO">
        <xs:annotation>
            <xs:documentation>
                The root node of the On Demand Affinity Data Request. Must contain information about a specific song or a list of songs.
            </xs:documentation>
        </xs:annotation>
        <xs:complexType>
            <xs:sequence>
                <xs:element ref="SongList" minOccurs="1" maxOccurs="1" />
            </xs:sequence>
        </xs:complexType>
    </xs:element>
    <xs:element name="SongList">
        <xs:complexType>
            <xs:sequence>
                <xs:element ref="Song" minOccurs="1" maxOccurs="n" />
            </xs:sequence>
        </xs:complexType>
    </xs:element>
    <xs:element name="Song">
        <xs:complexType>
            <xs:attribute name="id" type="xs:integer" use="required" />
            <xs:attribute name="limit" type="xs:integer" use="optional" />
        </xs:complexType>
    </xs:element>
</xs:schema>
```

APPENDIX 10

```xml
<?xml version="1.0" encoding="UTF-8" standalone="no"?>
<xs:schema xmlns:xs="http://www.w3.org/2001/XMLSchema" elementFormDefault="qualified">
    <xs:import namespace="http://www.w3.org/XML/1998/namespace" />
    <xs:element name="OnDemandSongAffinityData">
        <xs:annotation>
            <xs:documentation>
                The root node of the On Demand Affinity Data.
            </xs:documentation>
        </xs:annotation>
        <xs:complexType>
            <xs:sequence>
                <xs:element name="RevisionID" type="xs:string" minOccurs="1" maxOccurs="1" />
                <xs:element name="DataVersion" type="xs:string" minOccurs="1" maxOccurs="1" />
                <xs:element ref="SongList" minOccurs="1" maxOccurs="1" />
            </xs:sequence>
        </xs:complexType>
    </xs:element>
    <xs:element name="SongList">
        <xs:complexType>
            <xs:sequence>
                <xs:element ref="Song" minOccurs="1" maxOccurs="n" />
            </xs:sequence>
        </xs:complexType>
    </xs:element>
    <xs:element name="Song">
        <xs:complexType>
            <xs:sequence>
                <xs:element ref="AffinitySong" minOccurs="0" maxOccurs="n" />
            </xs:sequence>
            <xs:attribute name="id" type="xs:integer" use="required" />
            <xs:attribute name="limit" type="xs:integer" use="required" />
        </xs:complexType>
    </xs:element>
    <xs:element name="AffinitySong">
        <xs:complexType>
            <xs:attribute name="id" type="xs:integer" use="required" />
            <xs:attribute name="affinity" type="xs:integer" use="required" />
        </xs:complexType>
    </xs:element>
</xs:schema>
```

We claim:

1. A jukebox device connected to a network of jukebox devices and configured to play music data sets, each music data set having a plurality of identification values corresponding to a respective plurality of identification categories, the jukebox device comprising:
  (a) an input component;
  (b) an audio output;
  (c) a memory configured to store local play data and network popularity data, the local play data being periodically sent to the network and including a number of times each music data set is selected for play on the jukebox, the network popularity data being periodically received from the network and including popularity values for at least a portion of the plurality of identification values in at least one of the identification categories, the popularity values being determined by the network from local play data aggregated from the jukeboxes on the network and including an aggregate number of plays over a predetermined period for the identification values for the at least one of the identification categories; and
  (d) a controller configured to:
    (i) receive from the input component a string of characters;
    (ii) search simultaneously in each of the plurality of identification categories for identification values in each respective identification category that contain the string of characters,
    (iii) present a plurality of lists, each list corresponding to one of the plurality of identification categories and listing identification values containing the string of characters that belong to the respective identification category, the identification values in each list being ordered according to the network popularity data stored in the memory prior to receipt of the string of characters.

2. The jukebox device of claim 1, wherein the input component is at least one component selected from the group consisting of a touchscreen display input, a pushbutton, a track-ball, a touchpad, a mouse, a joy-stick, a foot-pedal, a voice recognition system, a keypad, and a keyboard.

3. The jukebox device of claim 1, wherein the string of characters is a word, a phrase, or a fragment thereof.

4. The jukebox device of claim 1, wherein the plurality of identification categories includes at least one of an album title, an artist name, a song title, or a genre of music.

5. The jukebox device of claim 1, wherein when the jukebox device is disconnected from the network, the plurality of lists each contain only identification values for music data sets that are stored in the memory, the controller being configured to, in each list, order the identification values for the music data sets stored in memory according to the network popularity data.

6. A jukebox network system having a plurality of jukebox devices connected over a network and configured to play music data sets selected by a user, each music data set having a plurality of identification values corresponding to a respective plurality of identification categories, each of the jukebox devices comprising:
  (a) an input component;
  (b) an audio output; and
  (c) a memory configured to:
    (i) store local play data, the local play data being uploadable to the network and including a number of times each music data set is selected for play on the jukebox device, and
    (ii) store network popularity data received from the network, the network popularity data including popularity values for at least a portion of the plurality of identification values in at least one of identification categories, the popularity values being determined by the network from the local play data aggregated from the plurality of jukebox devices on the network and including an aggregate number of plays over a predetermined period for the identification values for the at least one of the identification categories; and
  (d) a controller configured to, for a user-selected one of the plurality of identification values in at least one user-selected identification category, present corresponding identification values in another of the identification categories in a predetermined configuration based on the respective popularity values of the corresponding identification values from the network popularity data stored in the memory prior to the selection by the user.

7. The jukebox network system of claim 6, wherein the network sends network popularity data to each of the plurality of jukebox devices either at predetermined periodic intervals or upon receipt of a request for network popularity data by the jukebox device.

8. The jukebox network system of claim 6, wherein the network popularity data includes the number of times a particular music data set was selected for play during a predetermined time period.

9. The jukebox network system of claim 6, wherein a jukebox device requests network popularity data from the network for all of the identification categories.

10. The jukebox network system of claim 6, wherein the user-selected identification value is an artist and the corresponding identification values are songs of the artist.

11. The jukebox network system of claim 6, wherein the user-selected identification value is an album and the corresponding identification values are songs on the album.

12. The jukebox network system of claim 6, wherein the predetermined configuration of the corresponding identification values is a listing of the corresponding identification values in order from corresponding identification values having the highest popularity values to corresponding identification values having the lowest popularity values.

13. The jukebox network system of claim 6, wherein the predetermined configuration of the corresponding identification values is an ordering of the corresponding identification values with at least one of the corresponding identification values being emphasized.

* * * * *